United States Patent
Lee

(10) Patent No.: US 6,833,882 B2
(45) Date of Patent: Dec. 21, 2004

(54) LIQUID CRYSTAL DISPLAY DEVICE AND FABRICATING METHOD THEREOF AND METHOD OF REPAIRING PIXEL USING THE SAME

(75) Inventor: Su Woong Lee, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 14 days.

(21) Appl. No.: 10/028,307

(22) Filed: Dec. 28, 2001

(65) Prior Publication Data

US 2002/0163602 A1 Nov. 7, 2002

(30) Foreign Application Priority Data

May 7, 2001 (KR) ........................................ P2001-24592

(51) Int. Cl.[7] .............................................. G02F 1/136
(52) U.S. Cl. ............................ 349/43; 349/38; 349/39; 349/42; 349/192; 349/54; 349/139
(58) Field of Search ............................ 369/37, 39, 42, 369/47, 192, 54, 53, 139, 143, 43, 38

(56) References Cited

U.S. PATENT DOCUMENTS

| | | | | |
|---|---|---|---|---|
| 4,902,638 A | * | 2/1990 | Muto | ........................ 437/51 |
| 5,796,449 A | * | 8/1998 | Song | ........................... 349/54 |
| 6,016,174 A | * | 1/2000 | Endo et al. | .................... 349/43 |
| 6,256,076 B1 | * | 7/2001 | Bae et al. | ...................... 349/38 |
| 6,429,909 B1 | * | 8/2002 | Kim et al. | ..................... 349/54 |
| 6,441,401 B1 | * | 8/2002 | Jung et al. | .................... 257/72 |
| 2001/0013910 A1 | * | 8/2001 | Ahn et al. | ..................... 349/54 |
| 2002/0163602 A1 | * | 11/2002 | Lee | ............................. 349/43 |

* cited by examiner

Primary Examiner—Nathan J. Flynn
Assistant Examiner—Fazli Erdem
(74) Attorney, Agent, or Firm—Birch, Stewart, Kolasch & Birch, LLP

(57) ABSTRACT

This invention discloses a liquid crystal display device and a fabricating method therefore. In addition, the present invention discloses a pixel repairing method for increasing an aperture ratio and increasing a repair efficiency. If a fault occurs in a channel of a TFT, a pixel electrode is connected with a repair drain electrode of a previous TFT, after cutting a data signal from a data line to a TFT using a laser. Thus, a bad pixel cell can realize the same color as a previous pixel cell. By this arrangement, a brightness point may be removed from the display. Also, a repair efficiency is improved. Also, since the source electrode of a repair TFT and a main TFT is used commonly, a display area is increased and a high aperture ratio can be realized.

16 Claims, 52 Drawing Sheets

US 6,833,882 B2

LIQUID CRYSTAL DISPLAY DEVICE AND FABRICATING METHOD THEREOF AND METHOD OF REPAIRING PIXEL USING THE SAME

This nonprovisional application claims priority under 35 U.S.C. § 119(a) on patent Application No. 2001-24592 filed in Republic of Korea on May 7, 2001, which is herein incorporated by reference.

BACKGROUND OF THE INVENTION

1. Field of the Invention

This invention relates to a liquid crystal display device, and more particularly to a liquid crystal display device and a fabricating method thereof that is capable of increasing an aperture ratio and improving a repair efficiency at the same time. Also, this invention relates to a method of repairing a bad pixel by using the same.

2. Description of the Related Art

Generally, a liquid crystal display (LCD) controls a light transmittance using an electric field to display a picture. To this end, the LCD includes a liquid crystal panel having liquid crystal cells arranged in a matrix type, and a driving circuit for driving the liquid crystal panel. The liquid crystal panel is provided with pixel electrodes for applying an electric field to each liquid crystal cell, and a common electrode. Typically, the pixel electrode is provided on a lower substrate for each liquid crystal cell, whereas the common electrode is integrally formed on the entire surface of an upper substrate. Each of the pixel electrodes is connected to a thin film transistor (TFT) used as a switching device. The pixel electrode drives the liquid crystal cell, along with the common electrode, in accordance with a data signal applied via the TFT.

Referring to FIG. 1 and FIG. 2, a lower substrate 1 of a conventional LCD includes a TFT T arranged at an intersection between a data line 4 and a gate line 2, a pixel electrode 22 connected to a drain electrode 10 of the TFT, and a storage capacitor S positioned at an overlapping portion between the pixel electrode 22 and the previous gate line 2'.

The TFT T includes a gate electrode 6 connected to the gate line 2, a source electrode 8 connected to the data line 4, and the drain electrode 10 connected, via a contact hole 20, to the pixel electrode 22. Further, the TFT T includes a gate insulating film (not shown) for insulating the gate electrode 6 from the source electrode 8 and the drain electrode 10, and semiconductor layers 14 and 16 for defining a channel between the source electrode 8 and the drain electrode 10 by a gate voltage applied to the gate electrode 6. Such a TFT T responds to a gate signal from the gate line 2 to selectively apply a data signal from the data line 4 to the pixel electrode 22.

The pixel electrode 22 is positioned at a cell area divided by the data line 4 and the gate line 2 and is made from a transparent conductive material having a high light transmittance. The pixel electrode 22 is formed on a protective layer (not shown) which is spread on the entire surface of the lower substrate 1, and electrically connected with the drain electrode 10 through the contact hole 20 formed on the protective layer. The pixel electrode 22 generates a potential difference from a common transparent electrode (not shown) provided at an upper substrate (not shown) by the data signal applied via the TFT T. By this potential difference, a liquid crystal positioned between the lower substrate 1 and the upper substrate (not shown) is rotated due to its dielectric anisotropy. Thus, the liquid crystal allows a light applied, via the pixel electrode 22, from a light source to be transmitted into the upper substrate.

The storage capacitor S is charged with a voltage in an application period of a gate high voltage to the previous gate line 2' while discharging the charged voltage in an application period of a data signal to the pixel electrode, to thereby prevent a voltage variation in the pixel electrode 22. In this way, because the storage capacitor is used for having the pixel voltage remain stable, its capacitance value should be big enough. To this end, the storage capacitor S is formed in the manner of overlapping with the gate line 2' as having a gate insulating film (not shown) therebetween.

In this liquid crystal display device, when there is used a normally white TN mode type liquid crystal, if a defect occurs at the channel between the source electrode 8 and the drain electrode 10 a problem occurs. The pixel cell is displayed as a brightness point because a voltage is not applied to the pixel electrode 22. Because the bad pixel cell, having the drain electrode 10 and the source electrode 8 opened, is brightly displayed, an observer of the bad pixel cell will readily notice it. Thus a repair will be needed so that the observer will not perceive the bad pixel cell.

One way to repair the bad pixel cell is to connect the neck part of the channel between the source electrode 8 and the drain electrode 10. The connection may be made by a laser, such that the data signal is always applied from the data line 4 to the pixel electrode 22. Another way to repair the bad pixel cell is to directly connect the pixel electrode 22 to the data line 4 by welding the pixel electrode 22 with the laser.

In this case, the neighbor pixel cells of the repaired bad pixel cell realize normal color, whereas the bad pixel cell does not receive the desired data such that it is not possible for the liquid crystal display device to realize the complete color.

In FIG. 2, there is shown a liquid crystal display device disclosed in Japanese Patent Laid-open Gazette No. Pyung 02-170614 (publication date: Jul. 12, 1990), having a repaired TFT RT besides a main TFT MT and having the channels of the MT and the RT separately formed.

Referring to FIG. 2, there are a main TFT MT positioned at the area below the pixel electrode 22 and horizontally in the middle of the pixel electrode 22, and a repair TFT RT positioned at the area between the data line 4 and the pixel electrode 22. The main TFT MT includes the source electrode 8 formed so as to extend in a perpendicular direction to the data line 4 (the gate line 2 direction) and the drain electrode 10 connected with the pixel electrode 22. Also, the repair TFT RT includes the source electrode 28 for repair, which is projected to form from the data line 4, and the drain electrode 30 for repair, which is not connected with the pixel electrode 22.

The main TFT MT responds to a gate signal from the gate line 2 to selectively supply a data signal from the data line 4 to the pixel electrode 22. The pixel electrode 22 is positioned at the cell area divided by the data line 4 and the gate line 2, and generates a potential difference from a common transparent electrode (not shown) formed on an upper substrate by the data signal supplied via the main TFT MT. By this potential difference, the liquid crystal located between the lower substrate and the upper substrate rotates due to its dielectric anisotropy, and an incident light from a light source is transmitted toward the upper substrate via the pixel electrode 22.

If a failure of the main TFT MT occurs, the data signal is not supplied to the pixel electrode 22 from the data line 4 by cutting between the source electrode 8 and the data line 4 of the main TFT MT. Then, the pixel electrode 22 is welded by the laser 50 so as to have the drain electrode 30 for repair connected with the pixel electrode 22. By this arrangement, the data signal from the data line 4 is supplied to the pixel electrode 22 through the repair TFT RT including the source electrode 28 for repair and the drain electrode 30 for repair. As a result, the bad pixel cell realizes the normal color.

The background art having such a TFT repair structure of the liquid crystal display suffers drawbacks.

For example, when repairing the bad pixel cell with a broken wire, the source electrode 8 of the main TFT MT is rather long, being formed along the gate line 2 from the data line 4. Due to this, a display area decreases. The display area decreases as much as the area where the source electrode 8 is formed of metal, such that an aperture ratio decreases. As a result, it becomes difficult to form the storage capacitor by overlapping the gate line 2 with the pixel electrode 22.

Also, because the source electrode 8 of the main TFT MT and the source electrode 28 of the repair TFT RT are formed at separate areas, this also works as a factor reducing the aperture ratio. That is, because two source electrodes 8 and 28 diverging from the data line 4 are necessary in one pixel area and the two source electrodes 8 and 28 need space for themselves, the size of the pixel electrode 22 diminishes relatively.

Moreover, in the TFT RT, as in FIG. 2, when the drain 30 for repair and the pixel electrode 22 are planarly separated, it is difficult to connect the drain electrode 30 and the pixel electrode 22 by the laser in order to repair it. Further, the gate electrode 6 or a semiconductor layer (not shown) can be damaged during the process.

SUMMARY OF THE INVENTION

It is an object of the present invention to address one or more of the drawbacks associated with the background art.

It is an object of the present invention to provide a liquid crystal display device and a fabricating method thereof for increasing a repair efficiency and an aperture ratio at the same time.

Another object of the present invention is to provide a method of repairing a bad pixel by using the liquid crystal display device.

In order to achieve these and other objects of the invention, a liquid crystal display device according to one aspect of the present invention includes a main thin film transistor having a common source electrode receiving a data signal, a pixel drain electrode opposed to the common source electrode as having a predetermined main channel between them and connected to a first pixel electrode for driving the liquid crystal of a first horizontal line, and a gate electrode responding to a scan signal and switching on/off the main channel; an auxiliary thin film transistor having the common source electrode in the main thin film transistor, a gate line applying the scan signal to the gate electrode, and a repair drain electrode opposed to the common source electrode as having a predetermined auxiliary channel between them and formed to overlap with a second pixel electrode for driving the liquid crystal of a second horizontal line; and an active layer forming the main channel and the auxiliary channel, the active layer extended from the main channel to the auxiliary channel through the common source electrode area.

The device further includes a gate insulating film formed to cover the gate electrode and the gate line on a substrate; a semiconductor layer formed on the gate insulating film; a protective layer formed on the entire surface of the gate insulating film to cover the common source electrode, the pixel drain electrode and the repair drain electrode; and a contact hole formed in the protective film to have the pixel drain electrode electrically in contact with the pixel electrode.

In the device, the semiconductor layer is formed at the neighbor area of the main thin film transistor, the auxiliary thin film transistor and a data line.

In the device, the semiconductor layer is formed at the neighbor area of the main thin film transistor and the auxiliary thin film transistor.

The device further includes a gate insulating film formed to cover the gate electrode and the gate line on a substrate; a semiconductor layer formed on the gate insulating film; a protective layer formed on the entire surface of the gate insulating film to cover the common source electrode, the pixel drain electrode and the repair drain electrode; and a contact hole formed in the protective film to have the pixel drain electrode electrically in contact with the pixel electrode.

In the device, the common source electrode, the pixel drain electrode and the repair drain electrode are patterned simultaneously as the semiconductor layer.

In the device, the semiconductor layer is formed at the neighbor area of the main thin film transistor, the auxiliary thin film transistor and a data line.

In the device, the semiconductor layer is formed at the neighbor area of the main thin film transistor and the auxiliary thin film transistor.

A method of fabricating a liquid crystal display device according to another aspect of the present invention includes the steps of forming a gate line and a gate electrode on a substrate; forming a gate insulating film on the substrate; forming a semiconductor layer on the gate insulating film; forming a data line and a common source electrode on the gate insulating film, and in addition, forming a pixel drain electrode and a repair drain electrode to oppose the common source electrode such that a main channel of a main thin film transistor and an auxiliary channel of an auxiliary thin film transistor reside in the semiconductor layer at the same time; forming a protective layer on the gate insulating film to cover the common source electrode, the pixel drain electrode and the repair drain electrode; and forming a pixel electrode on the protective film to overlap with the repair drain electrode and to be electrically in contact with the pixel drain electrode.

In the method, the gate electrodes of the main thin film transistor and the auxiliary thin film transistor are unified at the common source electrode area.

In the method, the semiconductor layer is formed at the neighbor area of the main thin film transistor, the auxiliary thin film transistor and the data line.

In the method, the semiconductor layer is formed at the neighbor area of the main thin film transistor and the auxiliary thin film transistor.

The method includes the steps of forming a gate line and a gate electrode on a substrate; forming a gate insulating film on the substrate to cover the gate electrode and the gate line; forming a semiconductor layer, a common source electrode and a data line by depositing a semiconductor material and a metal layer on the gate insulating film and patterning them at the same time, and in addition, forming a pixel drain electrode and a repair drain electrode to oppose the common source electrode such that a main channel of a main thin film transistor and an auxiliary channel of an auxiliary thin film transistor reside in the semiconductor layer at the same time; forming a protective layer on the gate insulating film to cover the common source electrode, the pixel drain electrode and the repair drain electrode; and forming a pixel electrode on the protective film to overlap with the repair drain electrode and to be electrically in contact with the pixel drain electrode.

In the method, the gate electrodes of the main thin film transistor and the auxiliary thin film transistor are unified at the common source electrode area.

In the method, the semiconductor layer is formed at the neighbor area of the main thin film transistor, the auxiliary thin film transistor and the data line.

In the method, the semiconductor layer is formed at the neighbor area of the main thin film transistor and the auxiliary thin film transistor.

A repairing method of a liquid crystal display device according to another aspect of the present invention includes the steps of connecting a pixel drain electrode for driving to a pixel electrode of a first horizontal line, and in addition, providing a thin film transistor including a repair drain electrode that overlaps with a pixel electrode of a second horizontal line; sensing a bad pixel included in the horizontal lines; opening a part of a drain electrode for driving of the bad pixel; and connecting the repair drain electrode to the pixel electrode of the bad pixel such that the same color data as a normal pixel, is supplied to the pixel electrode of the bad pixel.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Figure 1:
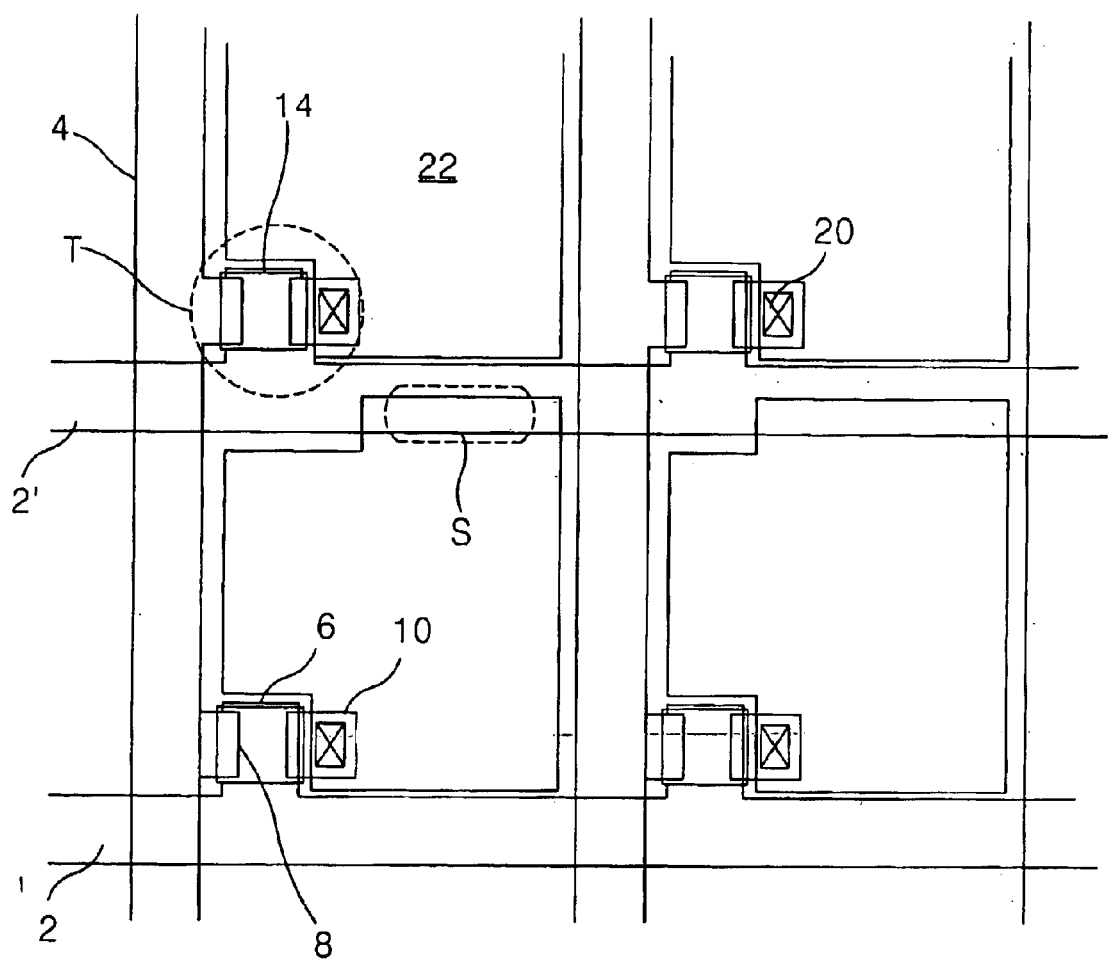
FIG. 1 is a plan view representing a conventional liquid crystal display device.
Figure 2:
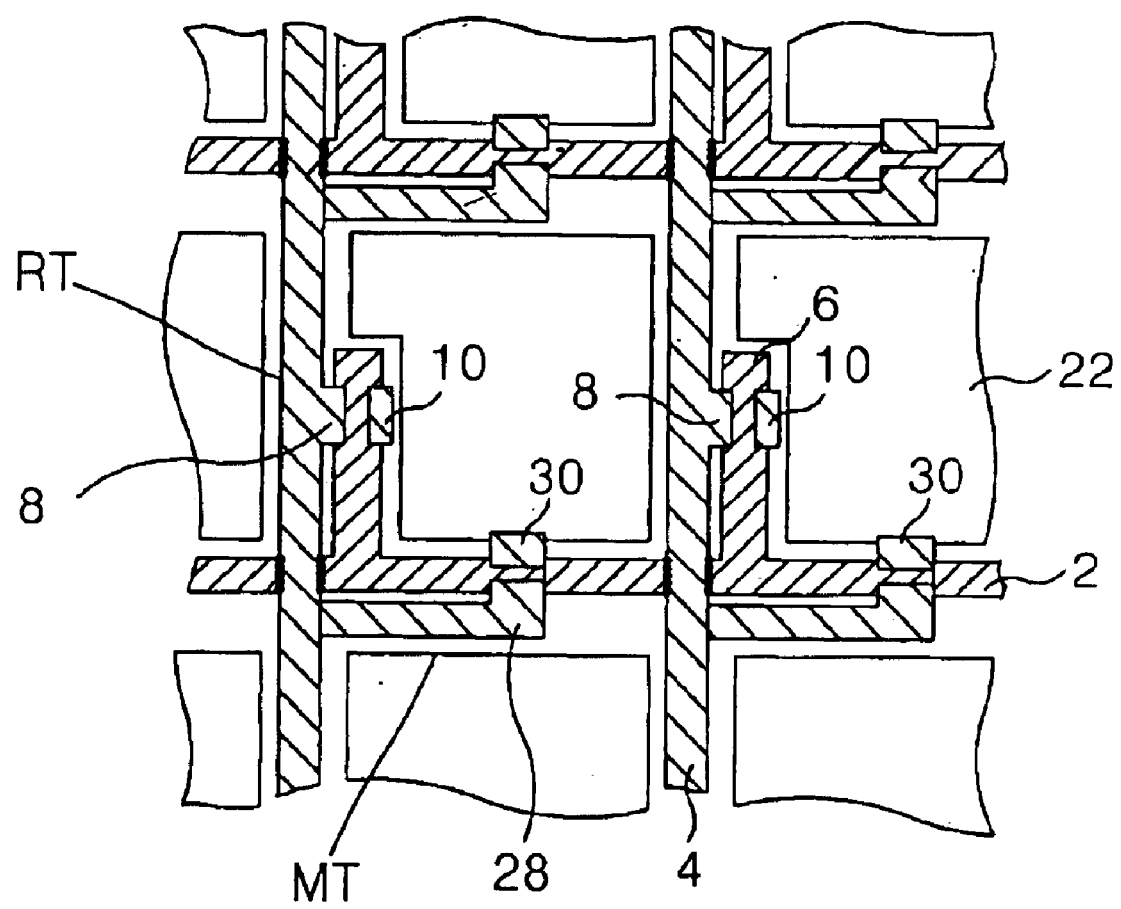
FIG. 2 is a plan view representing a conventional liquid crystal display device in which two TFT are formed in a pixel.
Figure 3:
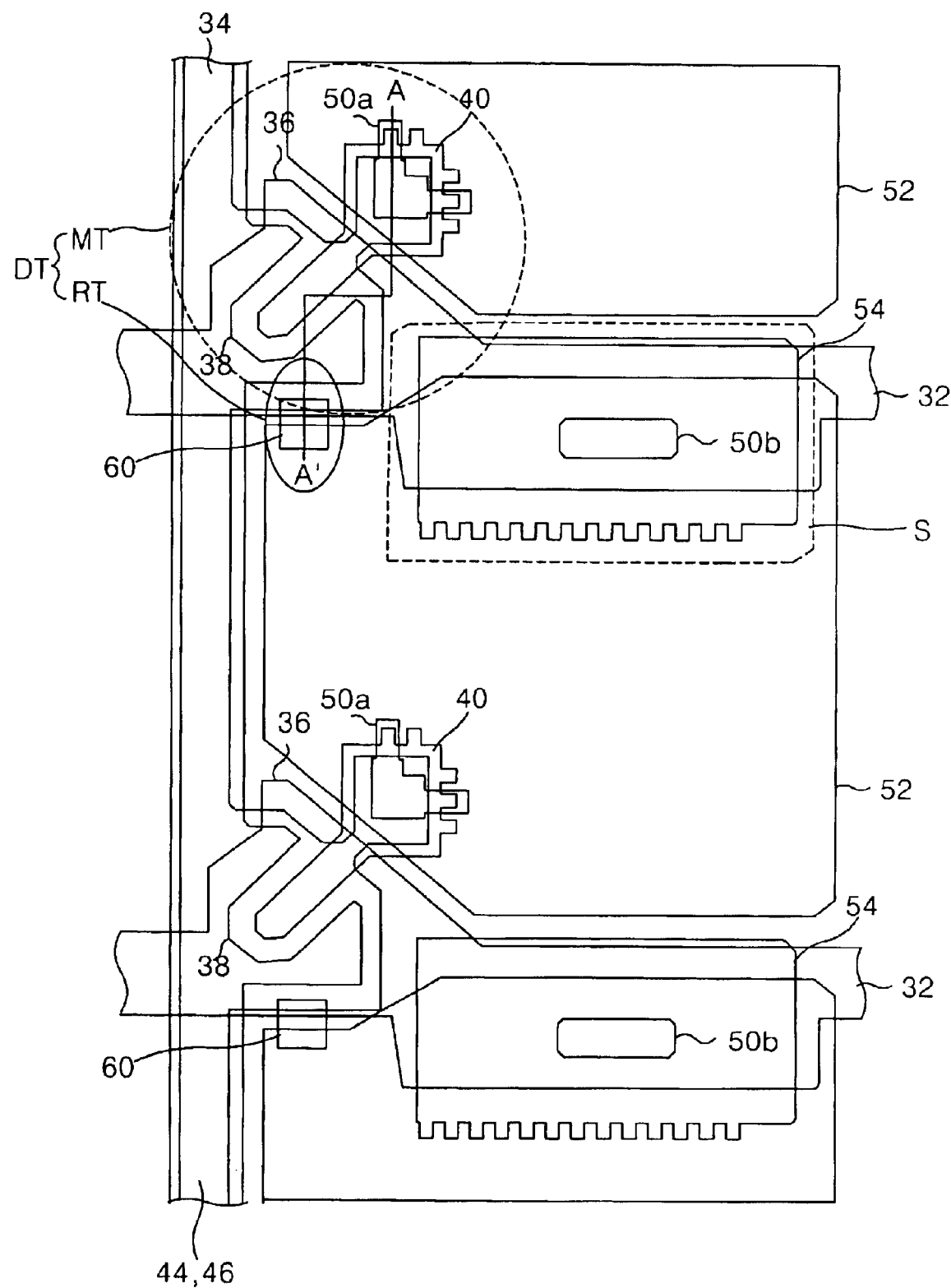
FIG. 3 is a plan view representing a liquid crystal display device according to a first embodiment of the present invention.
Figure 4:
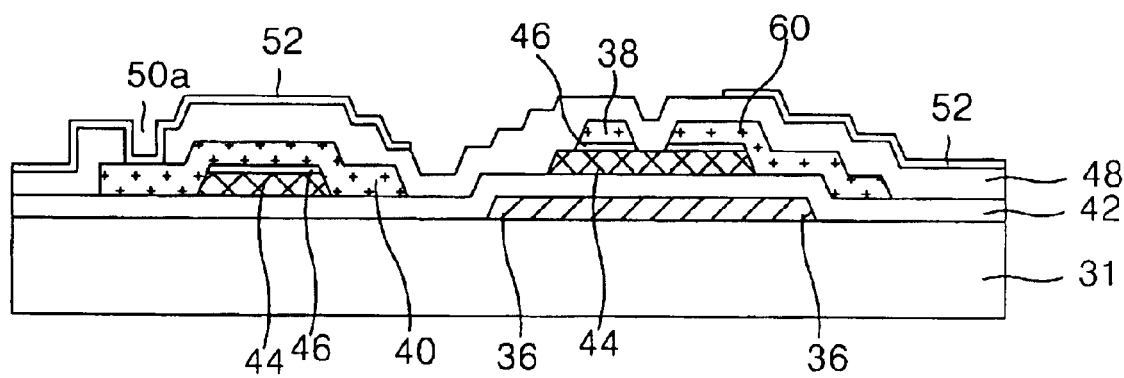
FIG. 4 is a sectional view representing the liquid crystal display device taken along the line A–A' in FIG. 3.

With reference to FIG. 3 to 22d, preferred embodiments of the present invention are explained as follows:

Referring to FIGS. 3 and 4, in a liquid crystal display device, according to a first embodiment of the present invention, a lower substrate 31 includes a dual channel TFT DT positioned at the intersection a data line 34 and a gate line 32.

The dual channel TFT DT has one common source electrode 38 being connected with the data line 34, and a pixel drain electrode 40 and a repair drain electrode 60 are formed at the neighboring part of the common source electrode 38. Each channel is respectively formed between the pixel drain electrode 40 and the common source electrode 38, and between the repair drain electrode 60 and the common source electrode 38. In the TFT of the liquid crystal display device, when positive data are inputted, an electric current flows from the data line 34 to the pixel electrode 52, when negative data are inputted, the electric current flows from a pixel to the data line 34, therefore a source terminal and a drain terminal are changed in accordance with the type of the input data.

However, the electrode connected to the data line 34, between two terminals of the TFT except a gate terminal, are supposed to be a common source electrode 38 and the electrode connected to the pixel electrode 52 are supposed to be a pixel drain electrode 40, for the sake of convenience in this invention.

The dual channel TFT DT includes a gate electrode 36 connected to the gate line 32, the common source electrode 38 connected to the data line 34 and the pixel drain electrode 40 connected to the pixel electrode 52 through a first contact hole 50a of a protective film 48. The dual channel TFT DT further includes a gate insulating film 42 for insulating the common source electrode 38, the pixel drain electrode 40 and the drain electrode for repair from the gate electrode 36. The dual channel TFT DT also includes semiconductor layers 44 and 46 for forming a channel between the common source electrode 38 and the pixel drain electrode 40 by a gate voltage supplied to the gate electrode 36. The dual channel TFT DT responds to the gate signal from the gate line 32 and selectively supplies the data signal from the data line 34 to the pixel electrode 52.

The pixel electrode 52 is positioned at the cell area divided by the data line 34 and the gate line 32, and is made of a transparent conductive material having a high light transmissivity. The pixel electrode 52 is formed on the protective film 48 which is spread on the entire surface of the lower substrate 31, and is electrically connected with the pixel drain electrode 40 through the first contact hole 50a formed in the protective film 48. The pixel electrode 52 generates a potential difference from a common transparent electrode (not shown) formed on a upper substrate, by the data signal supplied via the dual channel TFT DT. By such a potential difference, liquid crystal positioned between the lower substrate 31 and the upper substrate rotates by the dielectric anisotropy, and a light incident from a light source via the pixel electrode 52 is transmitted toward the upper substrate.

A storage capacitor formed at the overlapping part of the pixel electrode 52 and a previous gate line 32', is charged with a voltage during an application period of a gate high voltage to the previous gate line 32'. The capacitor sustains the charged voltage until data of the next frame is inputted so as to play a role in preventing a voltage variation of the pixel electrode 52. In this way, the capacitance value of the storage capacitor S should be large so that a pixel voltage remains stable. For this, the storage capacitor S is formed with the previous gate line 32' and a storage electrode 54 which is formed as overlapping with the gate line 32' and having a gate insulating film 42 in between them. The storage electrode 54 is electrically connected with the pixel electrode 52 through a second contact hole 50b formed in the protective film 48. The capacitance value of the storage capacitor can be increased by shortening the distance between two electric conductors 32 and 54. The storage electrode 54 is formed between the gate insulating film 42 and the protective film 48 when forming the data line 34, the common source electrode 38 and the pixel drain electrode 40. In the structure that the previous gate line 32' is a terminal of the storage capacitor S, it is important to increase the overlapping area of the pixel electrode 52 and the previous gate line 32'. When one pixel needs the repair TFT RT in addition, enough area for forming the storage capacitor can be obtained by adopting the dual channel TFT DT as in the embodiment.

The common source electrode 38 wraps around the pixel drain electrode 38 to form a channel having a 'U' shape. By widening the width of the channel, the flow of an electric current is made better.

The repair drain electrode 60 is formed to face with the lower part of the common source electrode 38 as having an auxiliary channel in between them. The repair drain electrode 60 is formed on a semiconductor layer 44 to overlap with the next pixel electrode. The repair drain electrode 60 does not work when a pixel cell is functioning normally. The repair drain electrod 60 is put to work only when the pixel cell goes bad. The repair drain is put to work by being connected with the previous pixel electrode 52' by the operation of a laser.

Figure 5:
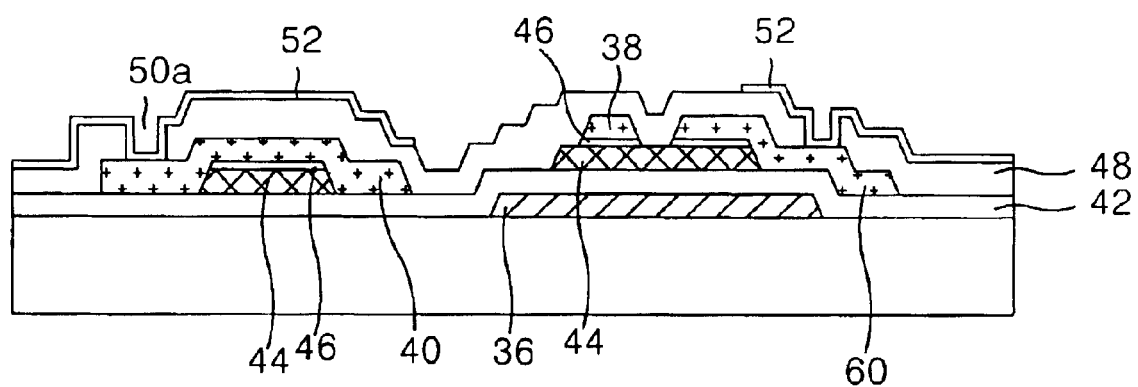
FIG. 5 is a sectional view representing the liquid crystal display device formed after implementing by laser the repair of the liquid crystal display device shown in FIG. 4.

If a broken wire occurs in the channel of the dual channel TFT DT, the neck part of the channel of the dual channel TFT DT is cut by using the laser, such that the data signal from the data line 34 is no longer supplied to the pixel electrode 52. When melting the neck part by the laser, the overlapping part of the pixel electrode 52 and the repair drain electrode 60 of the previous dual channel TFT DT, the protective film 48 between two electrodes 52 and 60 melt simultaneously to expose the repair drain electrode 60. The molten pixel electrode 52 flows into the lower part such that the pixel electrode 52 and the repair drain electrode 60 of the previous dual channel TFT DT are electrically connected, as shown in FIG. 5. Due to this, the data signal inputted to the previous pixel electrode 52' is supplied to the pixel electrode 52 upon the high pulse application of the previous gate line 32', such that the bad pixel cell realizes the same color as the previous one. Generally, the data output of an adjacent pixel is similar, such that the bad pixel is not very perceivable when controlled by the data of the previous pixel. In this case, there needs to be formed only one common source electrode 38 as a source electrode while having a structure practically capable of playing a role of two TFT. The area occupied by the source electrode can be reduced to thereby increase the proportion of a display area, e.g., to increase an aperture ratio of the display.

FIGS. 6A-6E and 7A-7E are sectional views and plan views, respectively. FIGS. 6a-7e represent a method of the liquid crystal display device shown in FIGS. 3 and 4.

Figure 6A:
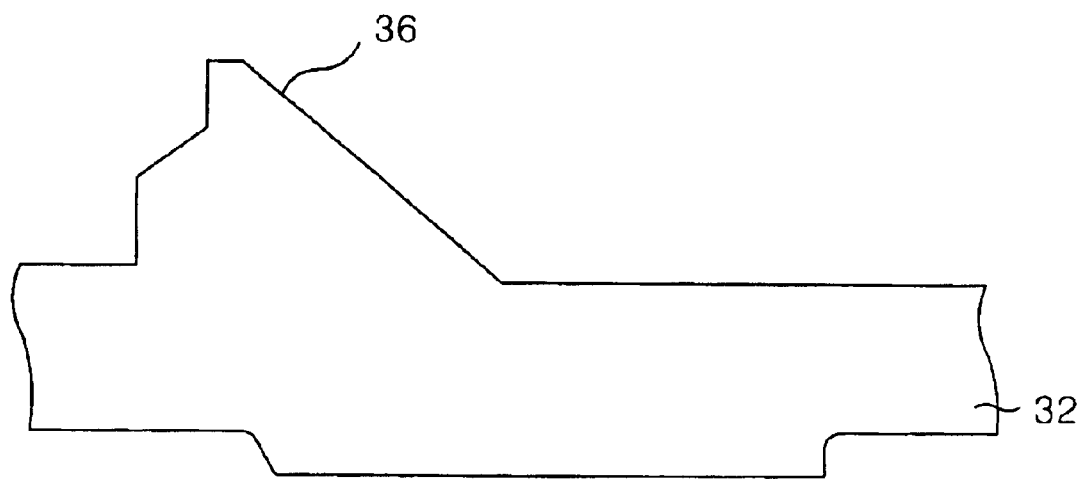
FIG. 6A to 6E are plan views representing a method of fabricating the liquid crystal display device shown in FIG. 3.
Figure 7A:
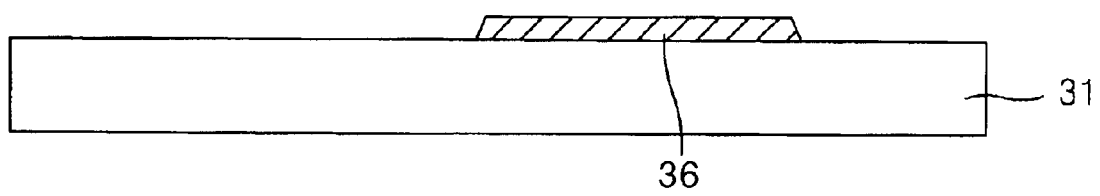
FIG. 7A to 7E are sectional views representing a method of fabricating the liquid crystal display device shown in FIG. 4.

Referring to FIGS. 6A and 7A, a gate line 32' and a gate electrode 36 are formed on a lower substrate 31.

The gate electrode 36 and the gate line 32' are formed by depositing aluminum (Al), copper (Cu) or similar conductors by a sputtering technique or other techniques, and then patterning it.

Figure 6B:
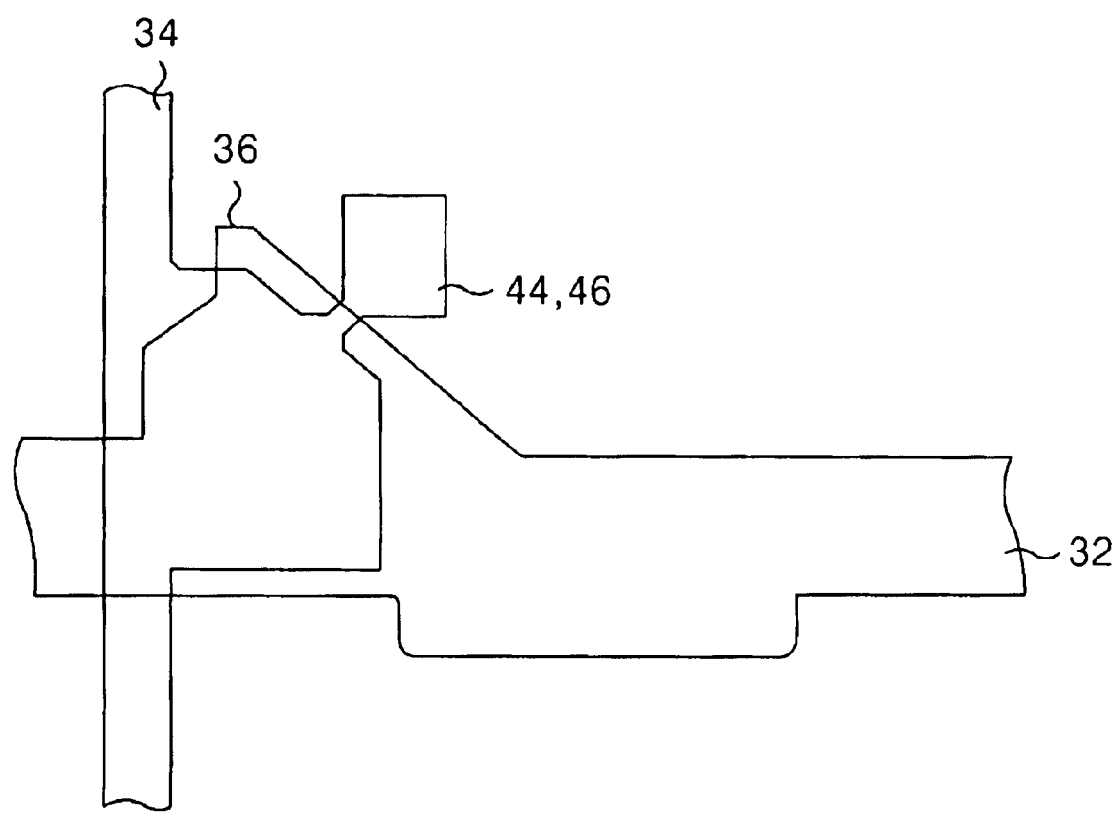
Figure 7B:
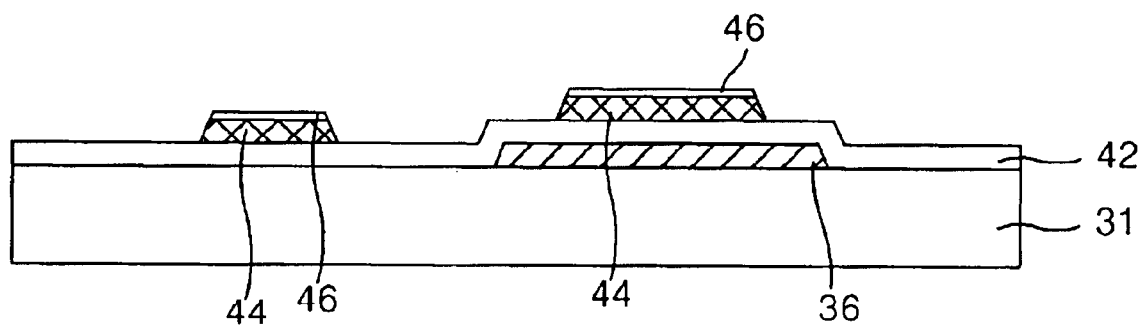

Referring to FIGS. 6B and 7B, an active layer 44 and an ohmic contact layer 46 are formed on a gate insulating film 42.

The gate insulating film 42 is formed by depositing an insulating material on the lower substrate by a plasma enhanced chemical vapor deposition (PECVD) technique. The active layer 44 and the ohmic contact layer 46 are formed by depositing a first and a second semiconductor materials on the gate insulating film 42 and then patterning them with a second mask.

The gate insulating film 42 is formed of an insulating material such as silicon nitride (SiNx), silicon oxide (SiOx) or other such materials. The active layer 44 is formed of an amorphous silicon not doped with impurities, a first semiconductor material. Also, the ohmic contact layer 46 is formed of an amorphous silicon doped with impurities, a second semiconductor material.

Figure 6C:
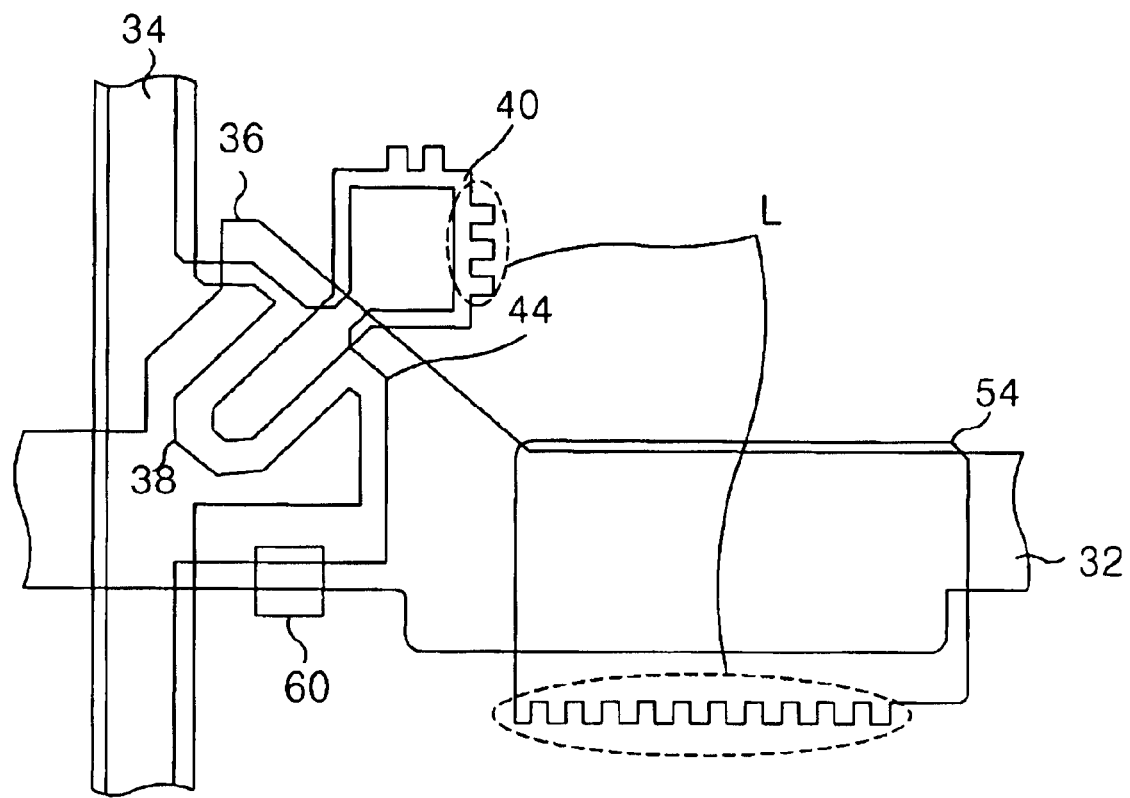
Figure 7C:
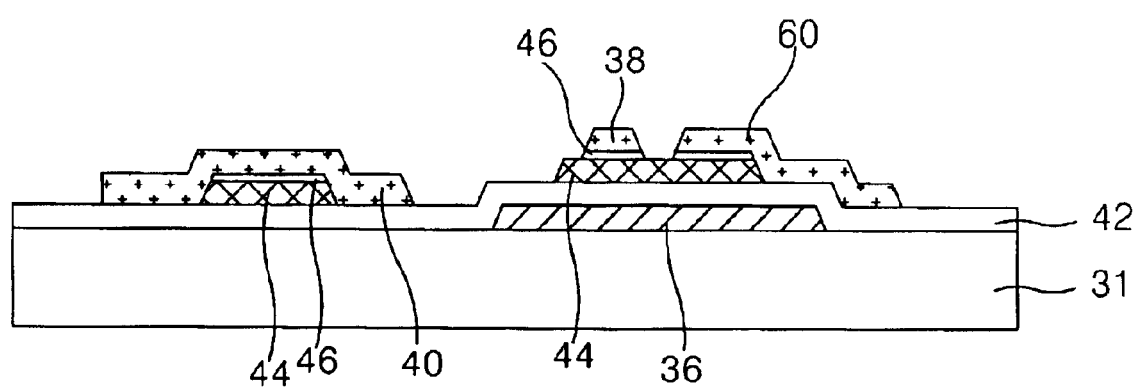

Referring to FIGS. 6C and 7C, a data line 34, at storage electrode 54, a common source electrode 38, a pixel drain electrode 40 and a repair drain electrode 60 are formed on the gate insulating film 42.

The data line 34, the storage electrode 54, the common source electrode 38, the pixel drain electrode 40 and the repair drain electrode 60 are formed by entirely depositing a metal layer by the CVD technique or the sputtering technique and then patterning it with a third mask. To prevent or reduce failures of a pixel electrode 52, caused by a profile difference at the edge of the electrode, a projected part L of a comb-shape is formed at the edge of the pixel drain electrode 40 and the storage electrode 54. Thereafter, the corresponding part of the ohmic contact layer 46 to the gate electrode 36 is patterned to expose the active layer 44. That is, a channel is form by eliminating the active layer 44 of the space between the common source electrode 38 and the pixel drain electrode 40 and the space between the common source electrode 38 and the repair drain electrode 60. The corresponding part of the active layer 44 to the gate electrode 36 between the common source electrode 38 and the pixel drain electrode 40 becomes the channel. And the corresponding part of the active layer 44 to the gate line 32 between the common source electrode 38 and the repair drain electrode 60 becomes an auxiliary channel. Accordingly, there are formed a main TFT MT having the common source electrode 38 as a source terminal and a pixel drain electrode 40 as a drain terminal, and a repair TFT RT having the common source electrode 38 as a source terminal and the repair drain electrode 60 as a drain terminal. The common source electrode 38 works as a source terminal of the main TFT MT, and the repair TFT RT, is used commonly. The active layer 44 and the gate terminals 32' and 36 of the two TFT MT and RT are formed to be connected with each other through the lower part of the common source electrode 38, thereby reducing the size of the area occupied by the dual channel TFT DT. By the present invention, the gate electrode 36 projects only once from the gate line 32' and plays a role as a gate for both the TFT MT and TFT RT.

The data line 4, the storage electrode 54, the common source electrode 38, the pixel drain electrode 40 and the repair drain electrode 60 are formed of chromium (Cr), molybdenum (Mo) or similar conductors.

Figure 6D:
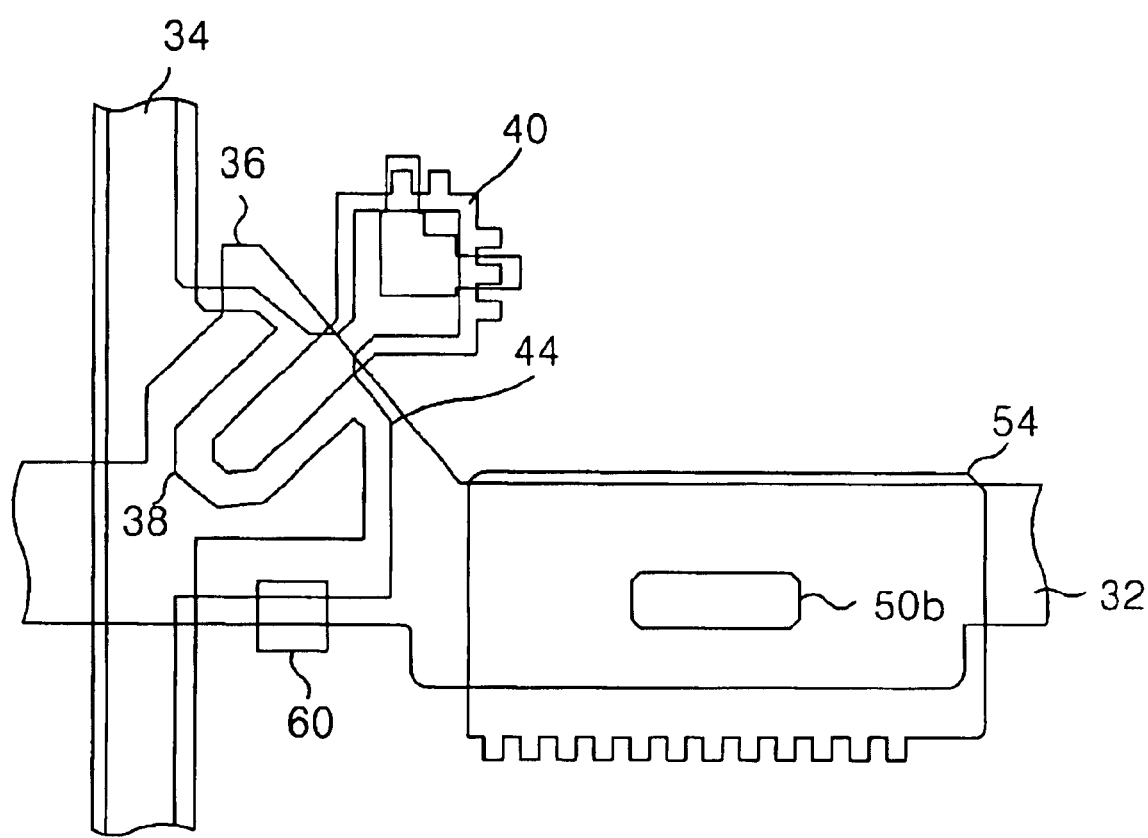
Figure 7D:
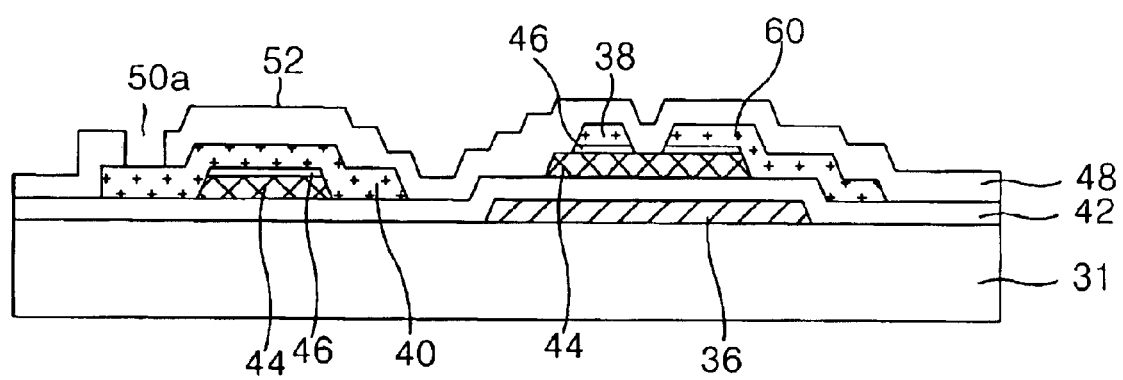

Referring to FIGS. 6D and 7D, a protective film 48 is formed on the gate insulating film 42.

The protective film 48 is formed by depositing an insulating material to cover a channel area, the pixel drain electrode 40, the repair drain electrode 60, the common source electrode 38 and the exposed gate insulating film 42. A first contact hole 50a and a second contact hole 50b are respectively formed in the protective film 48 on the pixel drain electrode 40 and the storage electrode 54.

The first contact hole 50a and the second contact hole 50b are formed by patterning with a fourth mask.

The protective film 48 is formed of an inorganic insulating material such as silicon nitride, silicon oxide or etc, or an organic insulating material such as acrylic organic compound, Teflon, benzocyclobutene BCB, cytop, perfluorocyclobutane or similar material.

Figure 6E:
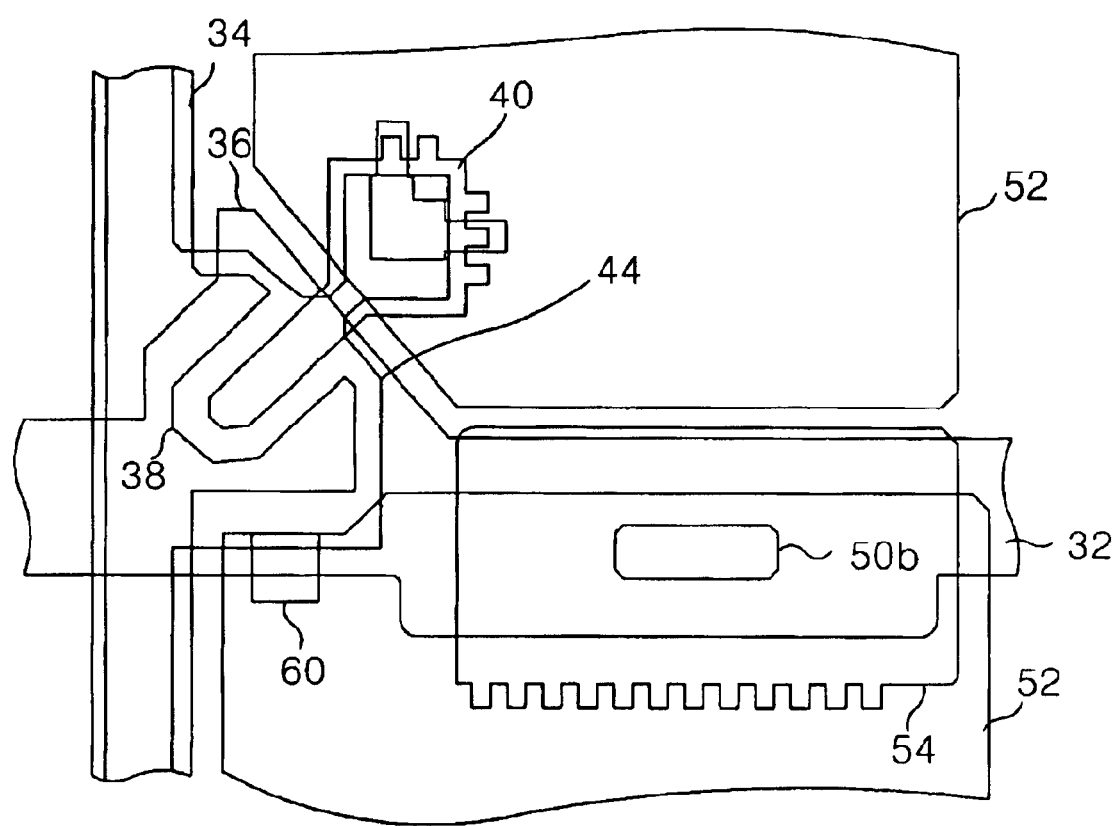
Figure 7E:
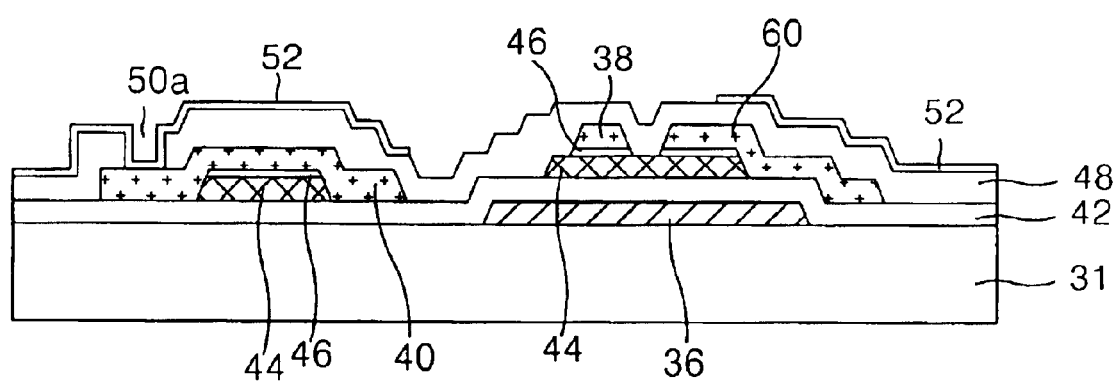

Referring to FIGS. 6E and 7E, the pixel electrodes 52 and 52' are formed on the protective film 48.

The pixel electrode 52 is formed by depositing any one of ITO, IZO and ITZO that are a transparent conductive material, and patterning it with a fifth mask. The pixel electrode 52 is electrically in contact with the pixel drain electrode 40 through the first contact hole 50a and with the storage electrode 54 through the second contact hole 50b.

Figure 8:
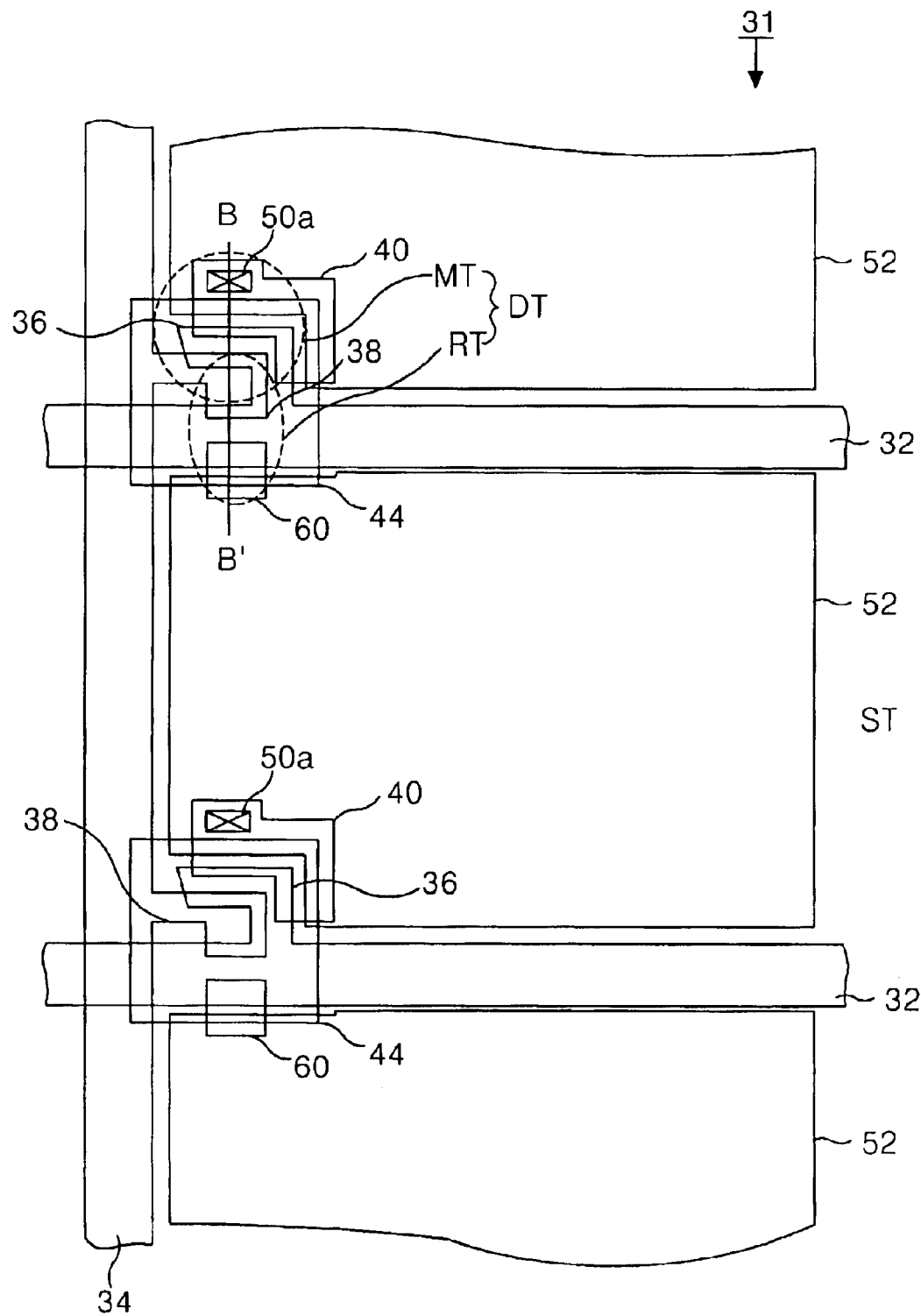
FIG. 8 is a plan view representing a liquid crystal display device according to a second embodiment of the present invention.
Figure 9:
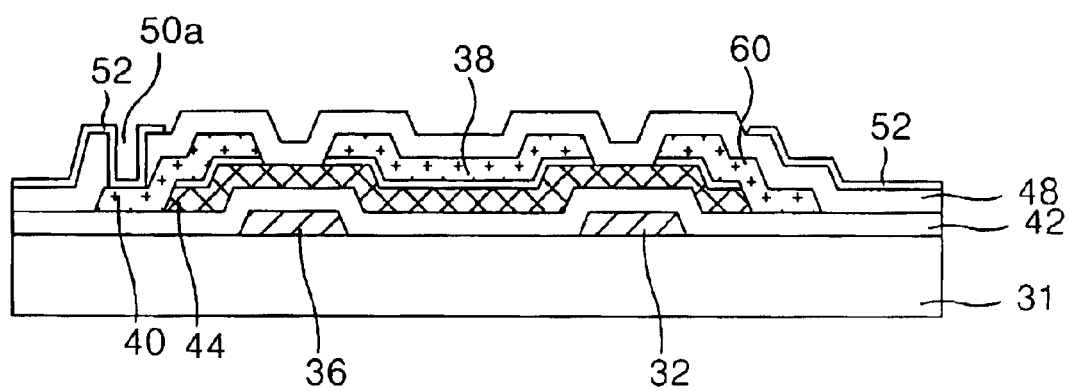
FIG. 9 is a sectional view representing the liquid crystal display device taken along the line B–B' in FIG. 8.

Referring to FIGS. 8 and 9, in a liquid crystal display device according to a second embodiment of the present invention, a lower substrate 31 includes the same structural elements as in the liquid crystal display device shown in FIG. 3, except that an active layer, being a semiconductor layer of the dual channel TFT DT, is formed only at the dual channel TFT DT area.

As described above, the dual channel TFT DT has one common source electrode 38 being connected with the data line 34. A pixel drain electrode 40 and a repair drain electrode 60 are formed at the neighboring part of the common source electrode 38. FIG. 8 also illustrates a main TFT MT and a repair TFT RT that have channels and auxiliary channels between the pixel drain electrode 40 and the common source electrode 38 and between the repair drain electrode 60 and the common source electrode 38, in the dual channel TFT DT.

In the main TFT MT, a channel is formed at the corresponding part of the active layer 44 to the gate electrode 36 between the common source electrode 38 and the pixel drain electrode 40. And the main TFT MT has the common source electrode 38 as a source terminal and the pixel drain electrode 40 as a drain terminal.

In the repair TFT RT, an auxiliary channel is formed at the corresponding part of the active layer 44 to the gate line 32 between the common source electrode 38 and the repair drain electrode 60. The repair TFT RT has the common source electrode 38 as a source terminal and the repair drain electrode 60 as a drain terminal. The repair drain electrode 60 is formed as overlapping with the pixel electrode 52.

The source terminal of the main TFT MT and the repair TFT RT are used as common source electrodes 38. The active layer 44 and the gate terminals 32 and 36 of the TFT MT and TFT RT are formed to be connected with each other through the lower part of the common source electrode 38. This reduces the size of the area occupied by the dual channel TFT DT. The gate electrode 36 projects only once from the gate line 32 and can play a role of the gate of the dual channel TFT DT.

Figure 10:
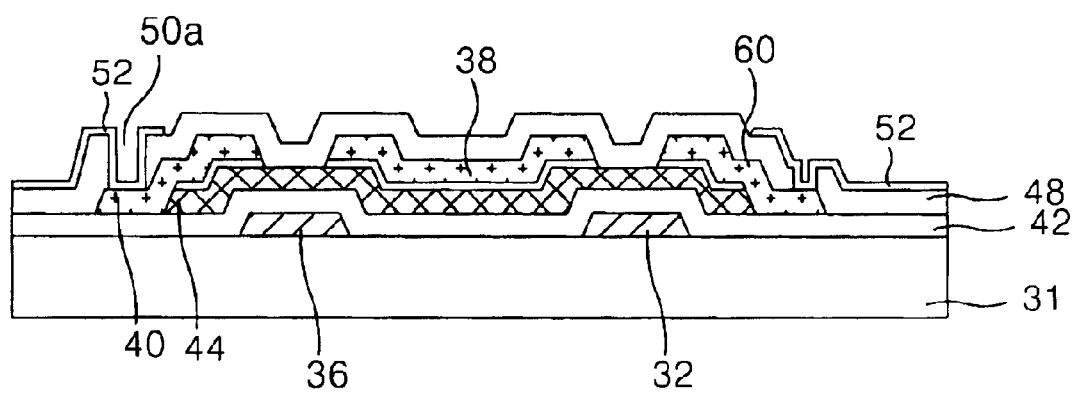
FIG. 10 is a sectional view representing the liquid crystal display device formed after implementing by laser the repair of the liquid crystal display device shown in FIG. 9.

If a broken wire fault occurs in the channel of the dual channel TFT DT, the neck part of the channel of the dual channel TFT DT is cut using the laser. As a result, the data signal from the data line 34 is no longer supplied to the pixel electrode 52. Next, the laser is used to melt the overlapping part of the pixel electrode 52 and the repair drain electrode 60 of the previous dual channel TFT DT, the protective film 48 between the pixel drain electrode 52 and the repair drain electrode 60 melts simultaneously to expose the repair drain electrode 60. The molten pixel electrode 52 flows into the lower part, such that the pixel electrode 52 and the repair drain electrode 60 of the previous dual channel TFT DT are electrically connected, as shown in FIG. 10. Due to this, the data signal inputted to the previous pixel electrode 52' is supplied to the pixel electrode 52 upon the high pulse application of the previous gate line 32' such that the bad pixel cell realizes the same color as the previous one. Generally, the data sizes of adjacent pixels are similar such that the bad pixel is not perceivable by inputting the data of the previous pixel. By the present invention, there needs to be formed only one common source electrode 38. The common source electrode is practically capable of playing a role with two TFT's. Therefore, the area occupied by the source electrode can be reduced to increase the proportion of a display area, that is, an aperture ratio.

Figure 11A:
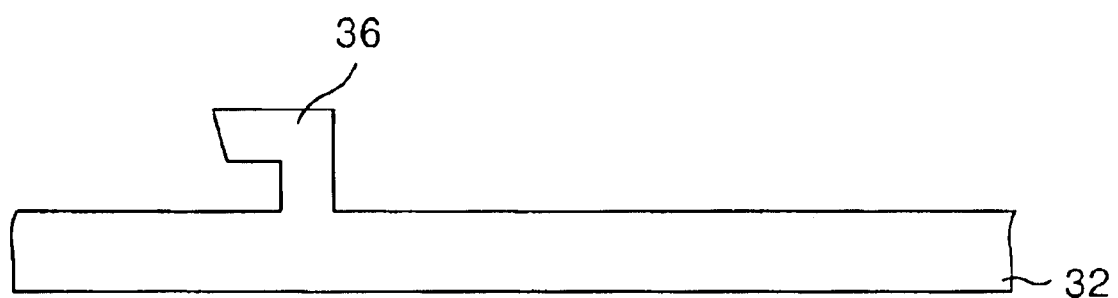
FIG. 11A to 11E are plan views representing a method of fabricating the liquid crystal display device shown in FIG. 8.
Figure 11B:
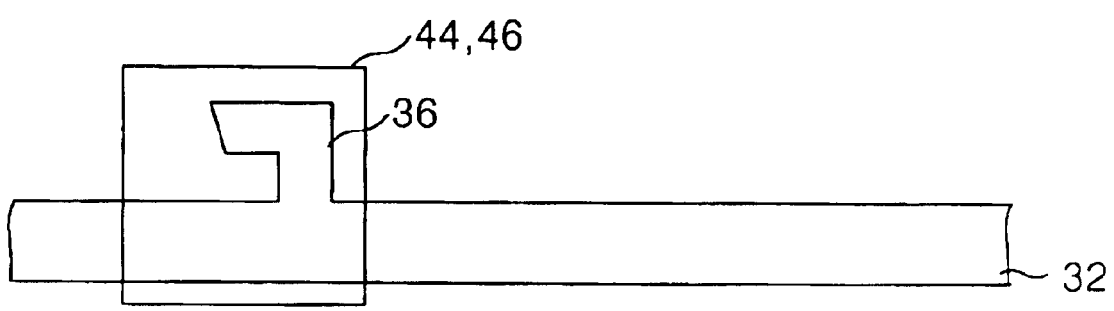
Figure 12A:
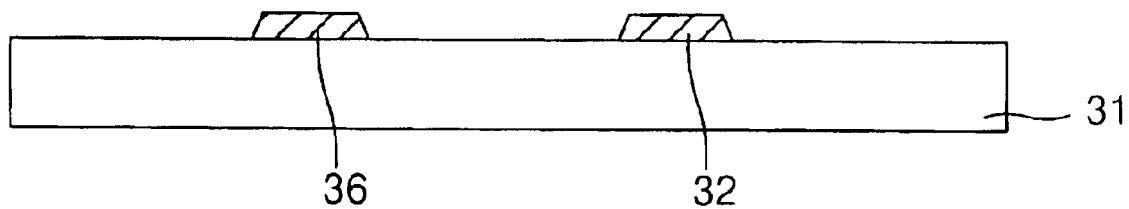
FIG. 12A to 12E are sectional views representing a method of fabricating the liquid crystal display device shown in FIG. 9.
Figure 12B:
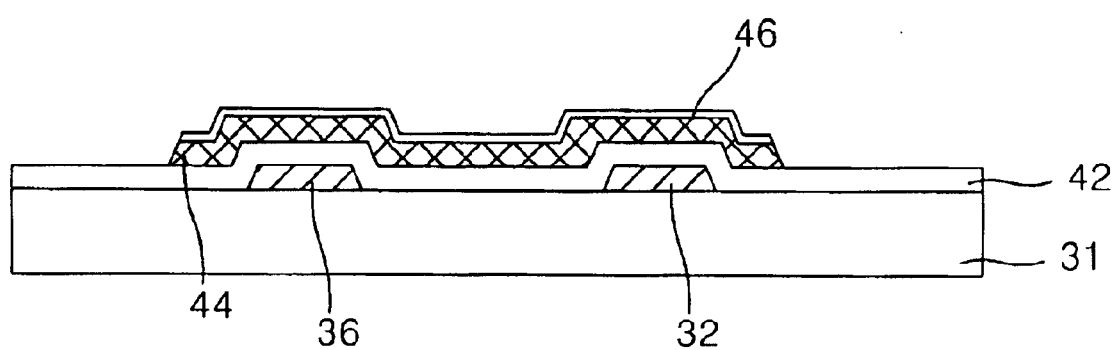

A method of fabricating a lower substrate 31 of the liquid crystal display device with such a constitution, includes the step of depositing a gate metal layer on the lower substrate 31. The gate metal layer is patterned to form the gate line 32 and the gate electrode 36, as shown in FIGS. 11A and 12A. Then, the gate insulating film 42 is entirely formed thereon. The active layer 44 and the ohmic contact layer 46 are formed only at the surrounding area of the dual channel TFT DT, as shown in FIGS. 11B and 12B, by depositing a first and a second semiconductor materials on the gate insulating film 42 and then patterning them.

Figure 11C:
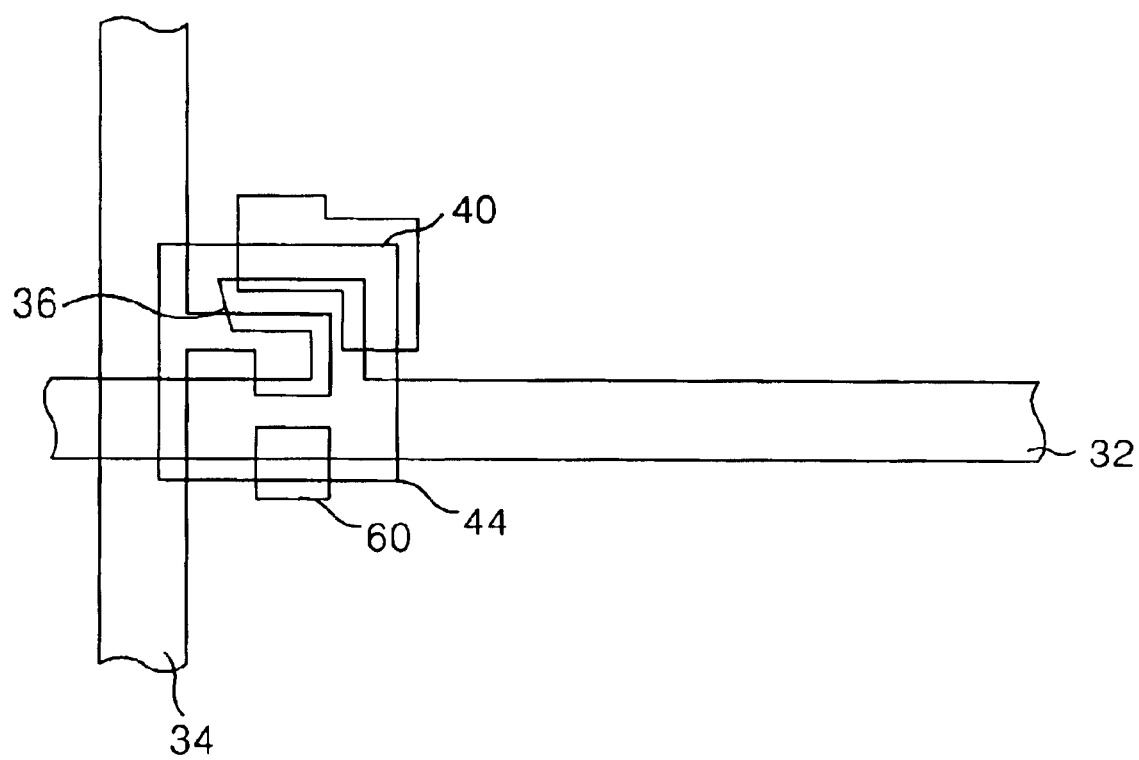
Figure 11D:
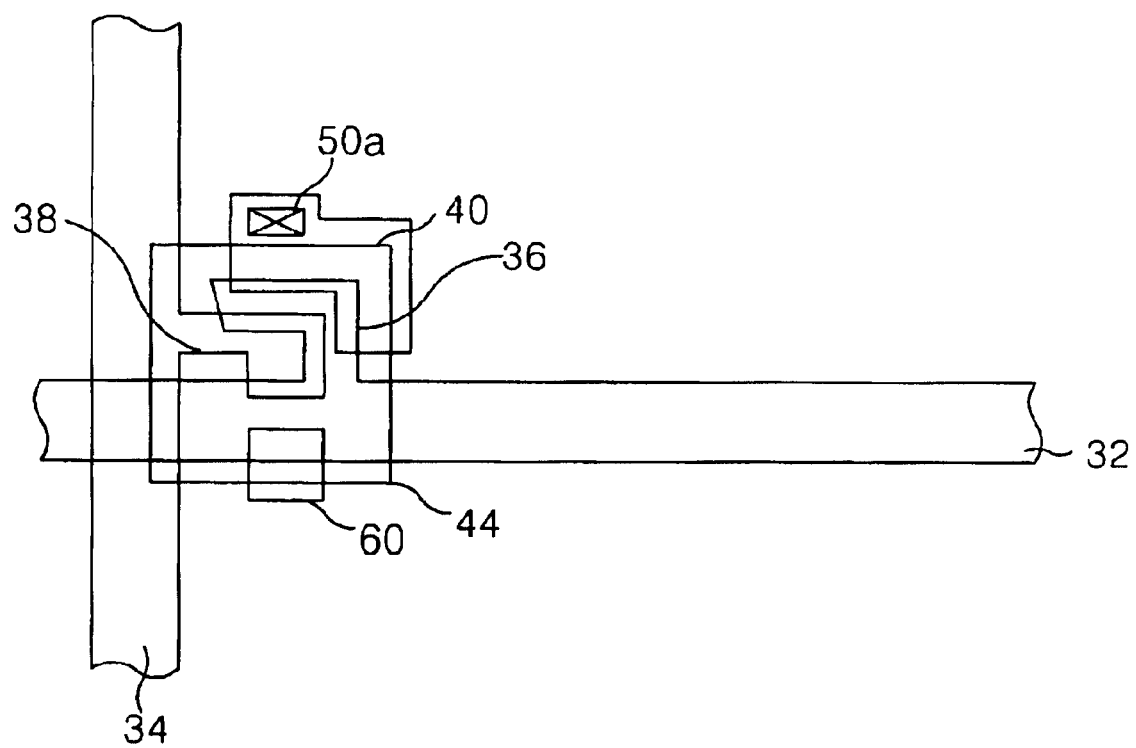
Figure 11E:
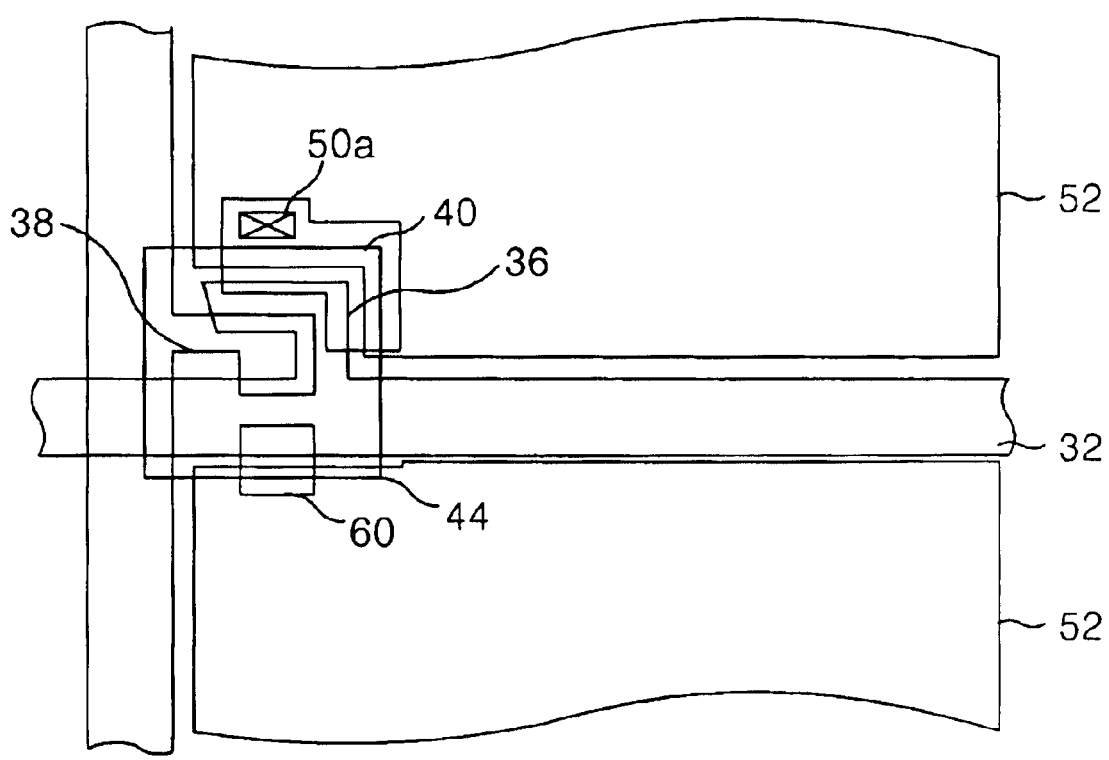
Figure 12C:
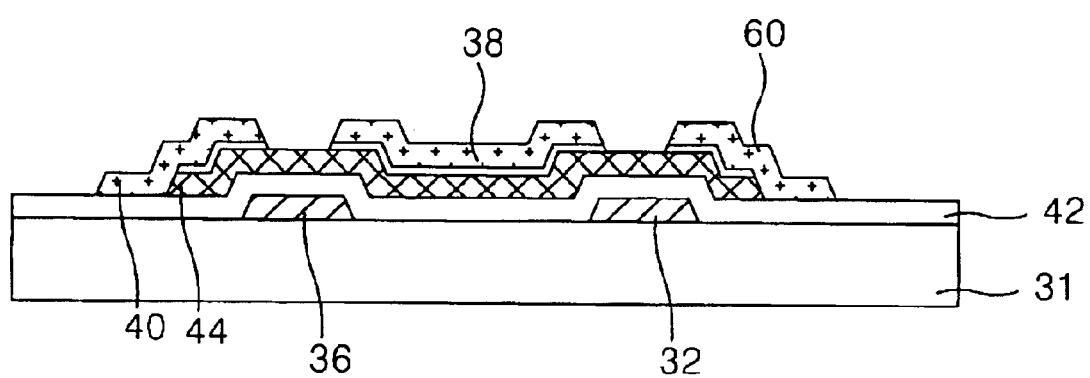
Figure 12D:
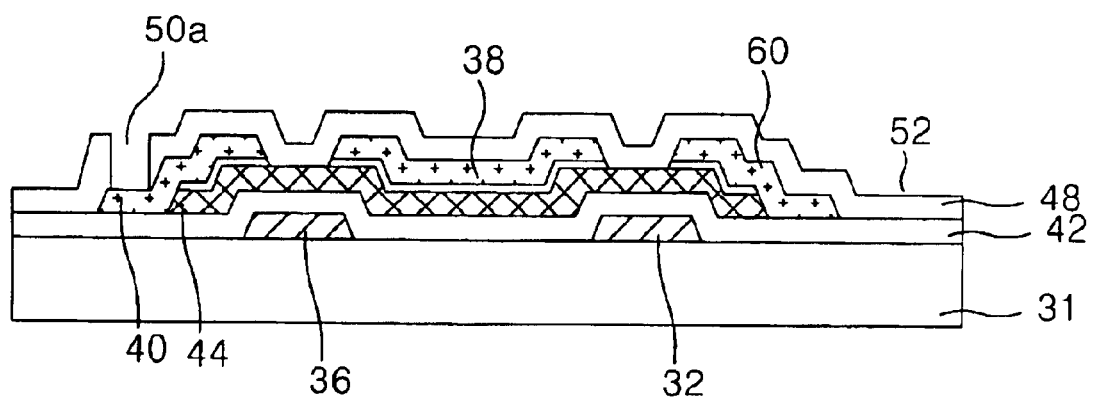
Figure 12E:
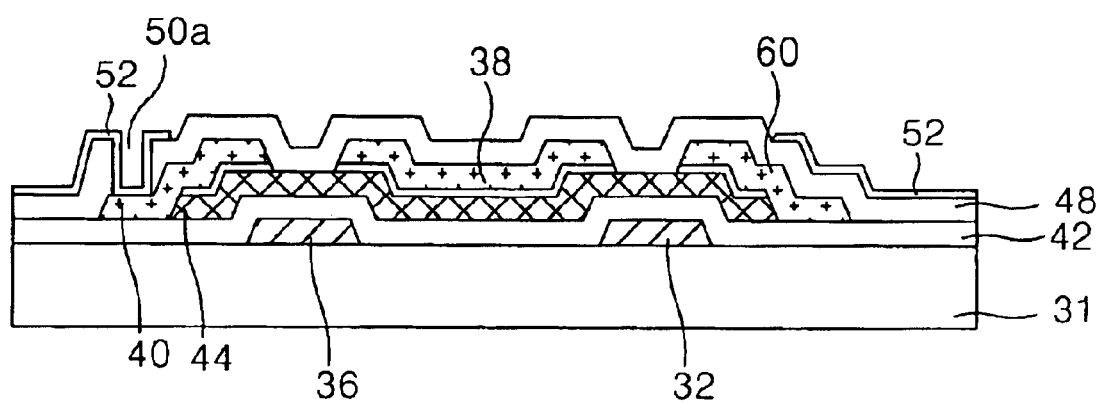

The data line 34, the repair drain electrode 60, the common source electrode 38 and the drain electrode 40 are simultaneously formed, as shown in FIGS. 11C and 12C, by depositing a metal layer on the gate insulating film 42 and then patterning it. Herein, the repair drain electrode is formed as overlapping with the next pixel electrode to be formed later. Afterwards, the protective film 48 is entirely spread and then patterned, thereby forming a contact hole as shown in FIGS. 11D and 12D. The pixel electrode 52 is formed, as shown in FIGS. 11E and 12E, by depositing a transparent conductive material on the protective layer 48 and patterning it.

Figure 13:
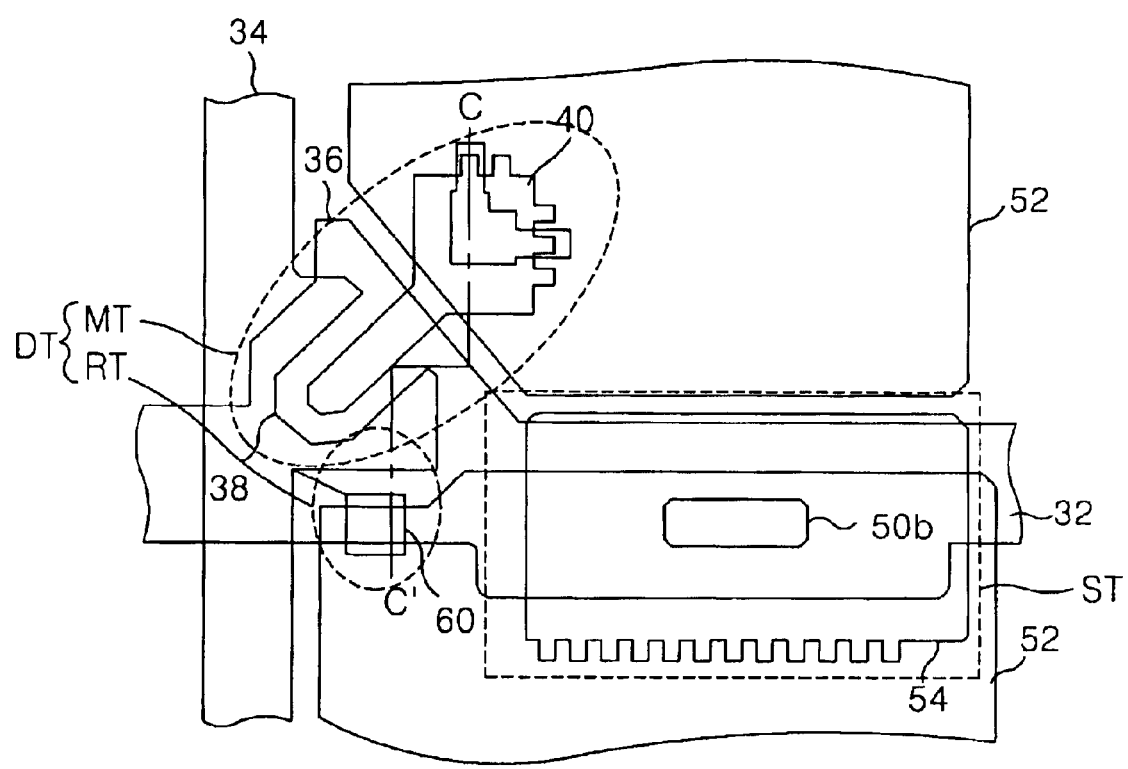
FIG. 13 is a plan view representing a liquid crystal display device according to a third embodiment of the present invention.
Figure 14:
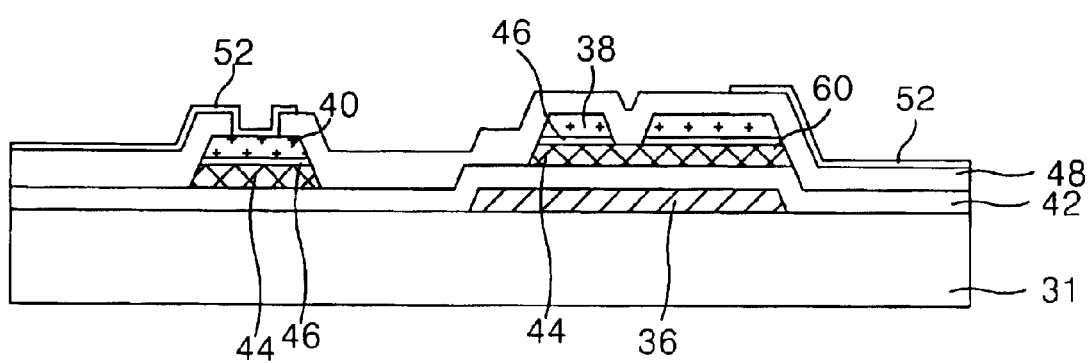
FIG. 14 is a sectional view representing the liquid crystal display device taken along the line C–C' in FIG. 13.

Referring to FIGS. 13 and 14, in a liquid crystal display device according to a third embodiment of the present invention, a lower substrate 31 includes the same structural elements as in the liquid crystal display device shown in FIG. 3, except semiconductor layers 44 and 46 are formed at the same time as a data line 34, a storage electrode 54, a common source electrode 38, a pixel drain electrode 40 and a repair drain electrode.

As described above, the dual channel TFT DT has one common source electrode 38 being connected with the data line 34. A pixel drain electrode 40 and a repair drain electrode 60 are formed at the neighboring part of the common source electrode 38. A main TFT MT and a repair TFT RT have channels and auxiliary channels between the pixel drain electrode 40 and the common source electrode 38 and between the repair drain electrode 60 and the common source electrode 38, in the dual channel TFT DT.

In the main TFT MT, a channel is formed at the corresponding part of the active layer 44 to the gate electrode 36 between the common source electrode 38 and the pixel drain electrode 40. The main TFT MT has the common source electrode 38, as a source terminal, and the pixel drain electrode 40, as a drain terminal.

In the repair TFT RT, an auxiliary channel is formed at the corresponding part of the active layer 44 to the gate line 32 between the common source electrode 38 and the repair drain electrode 60. The repair TFT RT has the common source electrode 38, as a source terminal, and the repair drain electrode 60, as a drain terminal. The repair drain electrode 60 is formed as overlapping with the pixel electrode 52.

The source terminal of the main TFT MT and the repair TFT RT are used as a common source electrode 38. The active layer 44 and the gate terminals 32 and 36 of the TFT MT and TFT RT are formed to be connected with each other through the lower part of the common source electrode 38. This arrangement reduces the size of the area occupied by the dual channel TFT DT. The gate electrode 36 projects only once from the gate line 32 and can play a role of the gate of the dual channel TFT DT.

Figure 15:
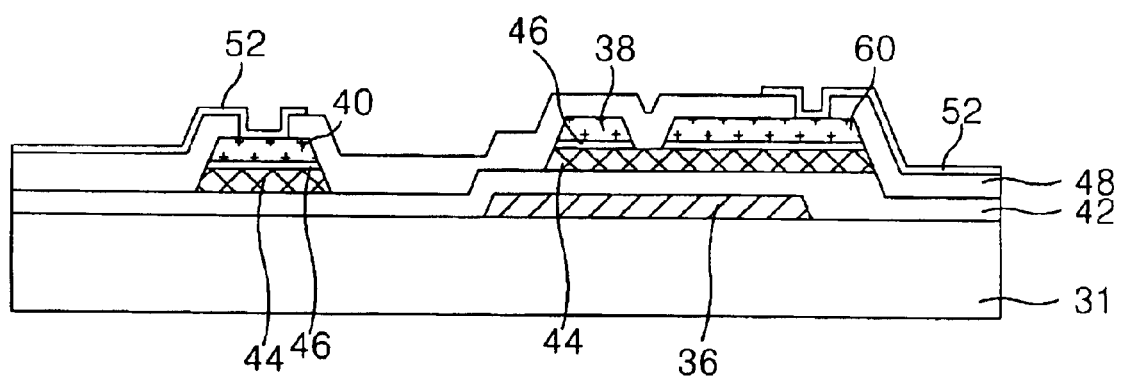
FIG. 15 is a sectional view representing the liquid crystal display device formed after implementing by laser the repair of the liquid crystal display device shown in FIG. 14.

If a broken wire fault occurs in the channel of the dual channel TFT DT, the neck part of the channel of the dual channel TFT DT is cut using the laser. As a result, the data signal from the data line 34 is no longer supplied to the pixel electrode 52. Next, the laser is used to melt the overlapping part of the pixel electrode 52 and the repair drain electrode 60 of the previous dual channel TFT DT, the protective film 48 between the pixel drain electrode 52 and the repair drain electrode 60 melts simultaneously to expose the repair drain electrode 60. The molten pixel electrode 52 flows into the lower part, such that the pixel electrode 52 and the repair drain electrode 60 of the previous dual channel TFT DT are electrically connected, as shown in FIG. 15. Due to this, the data signal inputted to the previous pixel electrode 52' is supplied to the pixel electrode 52 upon the high pulse application of the previous gate line 32' such that the bad pixel cell realizes the same color as the previous one.

Generally, the data sizes of adjacent pixels are similar such that the bad pixel is not perceivable by inputting the data of the previous pixel. By the present invention, there needs to be formed only one common source electrode 38. The common source electrode is practically capable of playing a role with two TFT's. Therefore, the area occupied by the source electrode can be reduced to increase the proportion of a display area, that is, an aperture ratio.

FIGS. 16A to 17F are sectional views representing a method of fabricating the liquid crystal display shown in FIG. 13.

Figure 16A:
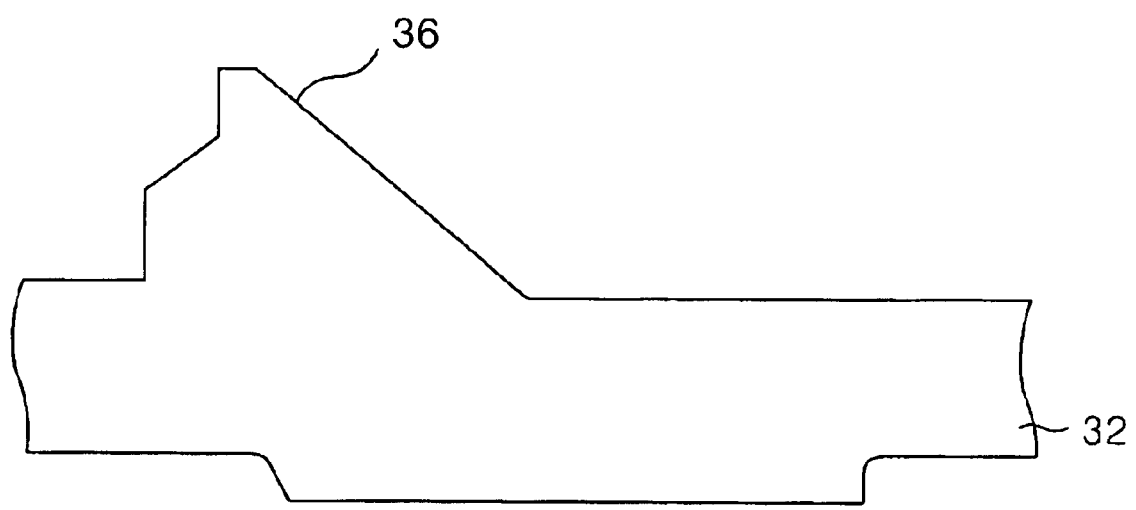
FIG. 16A to 16D are plan views representing a method of fabricating the liquid crystal display device shown in FIG. 13.
Figure 17A:
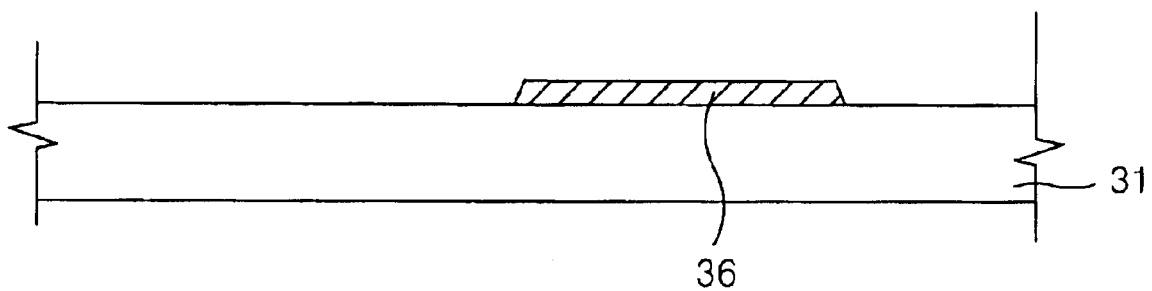
FIG. 17A to 17F are sectional views representing a method of fabricating the liquid crystal display device shown in FIG. 14.

Referring to FIGS. 16A and 17A, a gate line 32' and a gate electrode 36 are formed on a lower substrate 31. The gate electrode 36 and the gate line 32' are formed by depositing aluminum (Al), copper (Cu) or similar materials by a sputtering technique or similar technique, and then patterning it with a first mask.

Figure 17B:
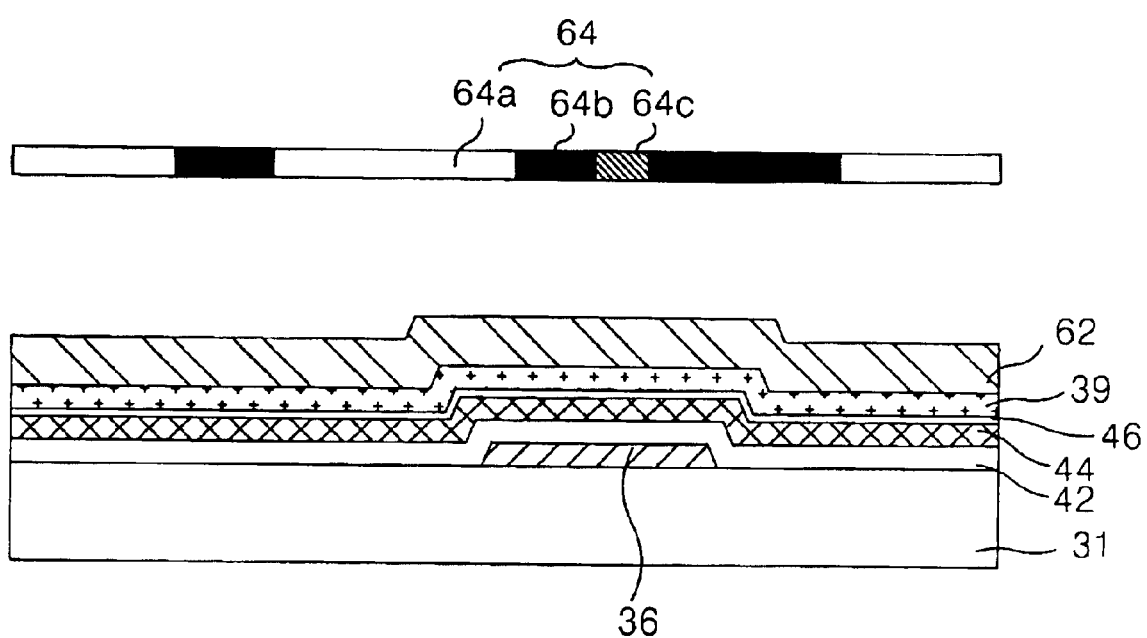

Referring to FIG. 17B, a photoresist 62 is formed on top of the gate insulating film 42. And there is positioned at the upper part of the photoresist 62 a diffraction mask 64, as a second mask, having a transmission part 64a, a masking part 64b and a diffraction part 64c.

The gate insulating film 42 is formed by entirely depositing an insulating material by the plasma enhanced chemical vapor deposition (PECVD) technique to cover the gate electrode 36. The photoresist 62 is formed by entirely depositing a first and a second semiconductor layer materials 45a and 45b and a metal layer 39 on the gate insulating film 42 and then patterning them with a second mask.

The gate insulating film 42 is formed of an insulating material such as silicon nitride SiNx, silicon oxide SiOx. The first and the second semiconductor layer materials 45a and 45b are formed of an amorphous silicon, not doped with impurities, and an amorphous silicon doped with impurities. Also, the metal layer 39 is formed of such materials as chromium (Cr) or molybdenum (Mo).

The masking part 64b of the diffraction mask 64 is positioned at the area where the repair drain electrode 60, the common source electrode 38 and the drain electrode 40 are to be formed. The diffraction part 64c is positioned at the area where a channel is to be formed between the common source electrode 38 and the drain electrode 40. The transmission part 64a is positioned at another area.

The diffraction mask 64 selectively irradiates an ultraviolet ray to and exposes the photoresist 62.

Figure 17C:
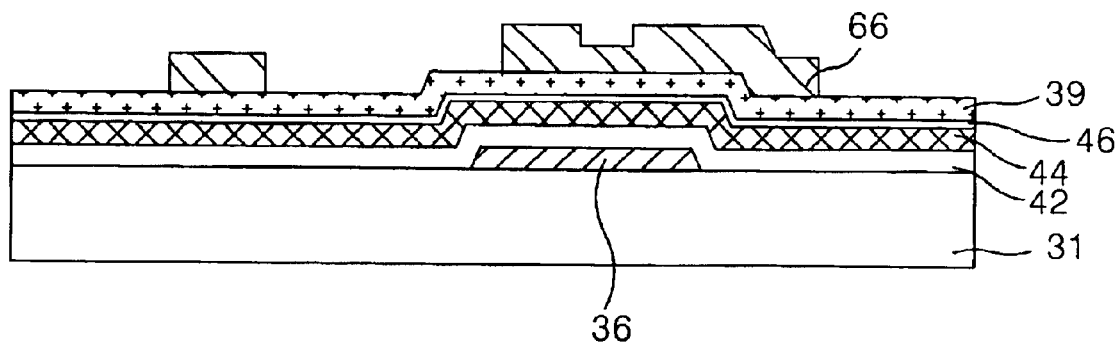

Referring to FIG. 17C, a photoresist pattern 66 is formed in the upper part of the gate insulating film 42.

The photoresist pattern 66 is formed by developing the photoresist 62 with a developing solution such as an aqueous solution. The photoresist pattern 66 of the initially spread thickness is formed at the corresponding area to the masking part 64b. The photoresist pattern 66 of approximate 10~50% of the initially spread thickness is formed at the corresponding area to the diffraction part 64c. The photoresist pattern is eliminated at the corresponding area to the transmission part 64a to expose the metal layer 39.

Figure 16B:
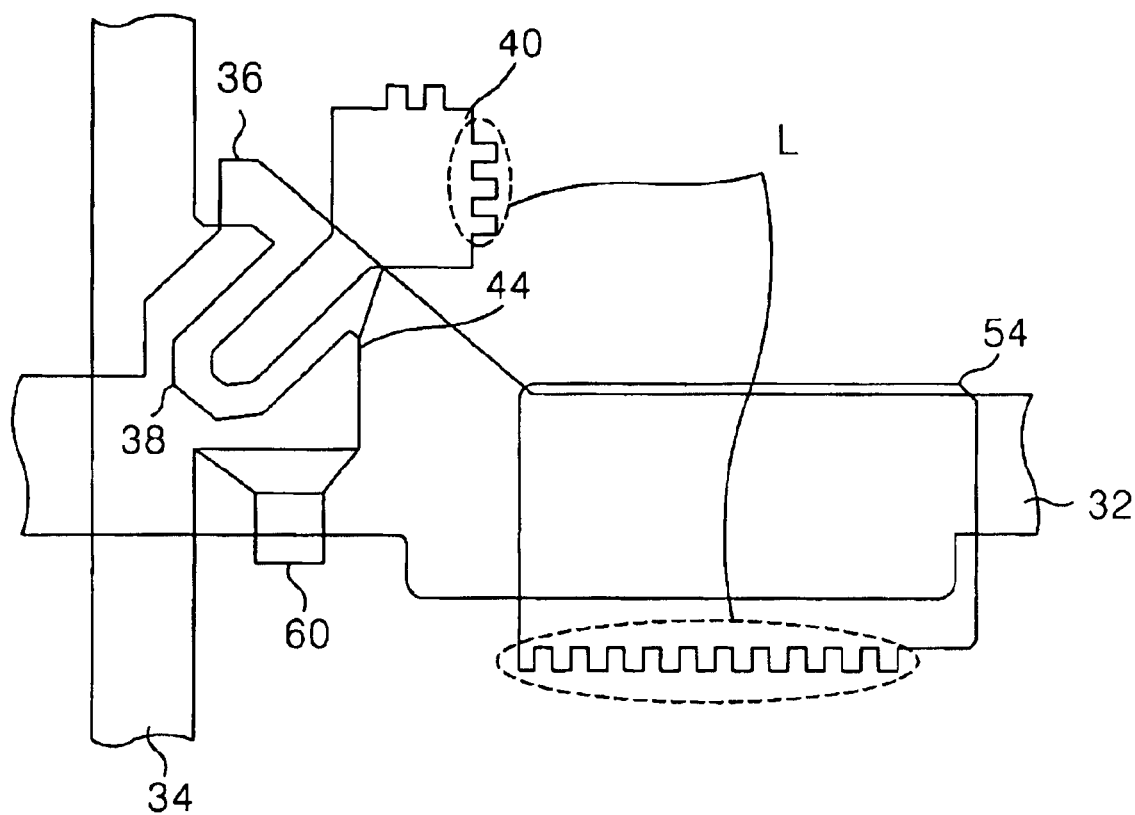
Figure 17D:
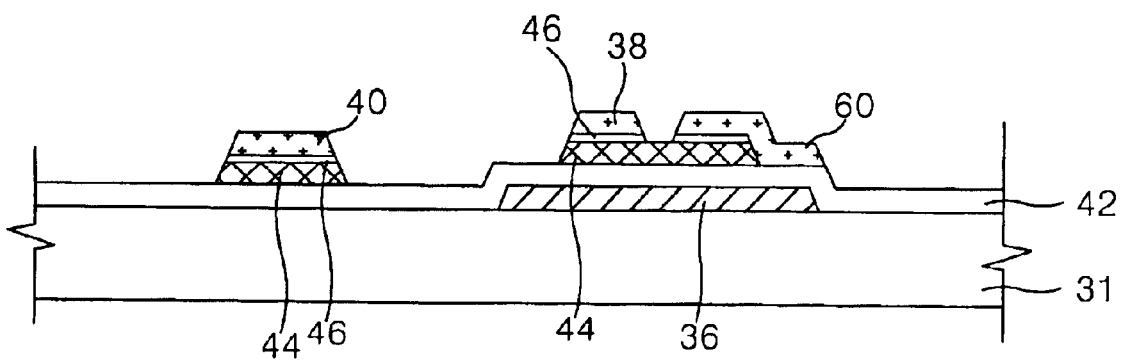

Referring to FIGS. 16B and 17D, the active layer 44, the ohmic contact layer 44, the repair drain electrode 60, the common source electrode 38 and the pixel drain electrode 40 are formed on the gate insulating film 42.

A profile at the edge of the electrode, in the form of a projected part L having a comb-shape is formed at the edge of the pixel drain electrode 40 and the storage electrode 54. The comb-shape profile is for preventing failure of a pixel electrode 52.

The active layer 44, the ohmic contact layer 46, the storage electrode 54, the repair drain electrode 60, the common source electrode 38 and the pixel drain electrode 40 are formed by simultaneously patterning the metal layer 39 and the first and the second semiconductor layer materials 45a and 45b by using the photoresist pattern 66. The photoresist pattern 66 is eliminated after forming the active layer 44, the ohmic contact layer 46, the repair drain electrode 60, the common source electrode 38 and the drain electrode 40.

Figure 16C:
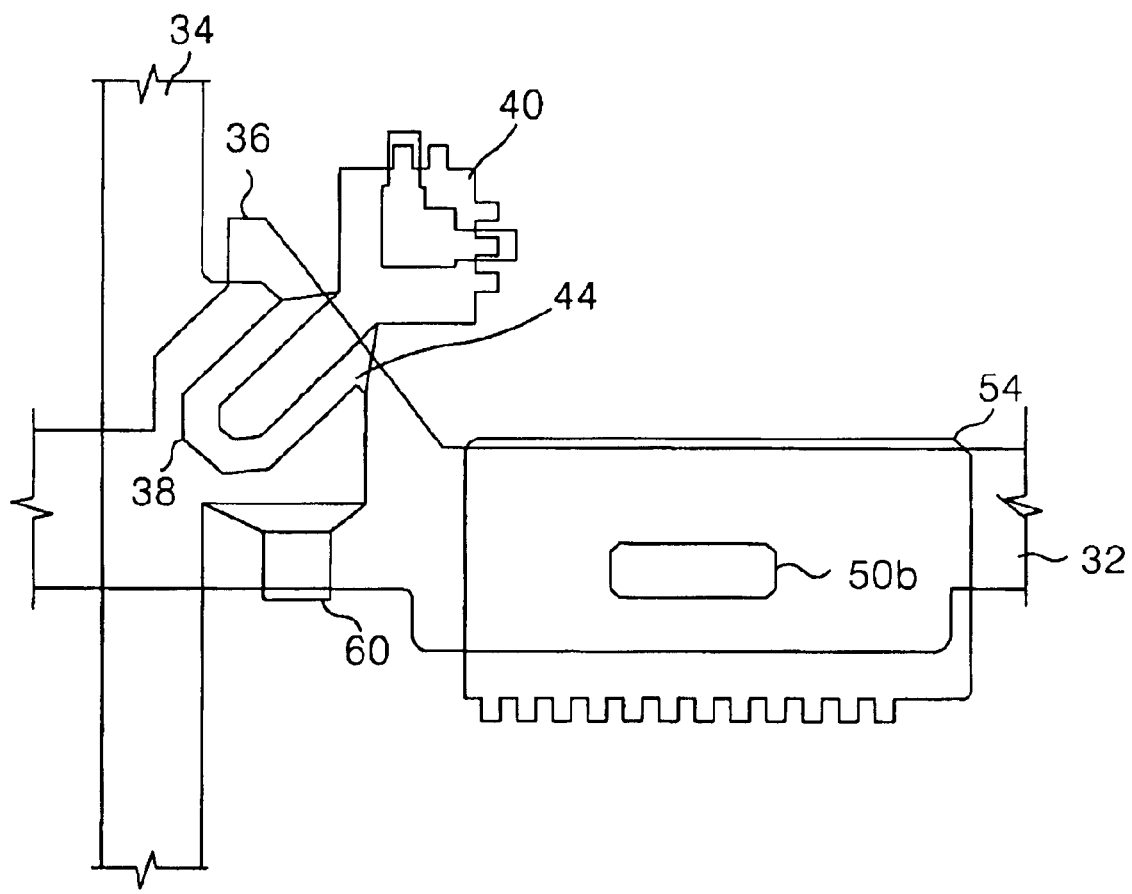
Figure 16D:
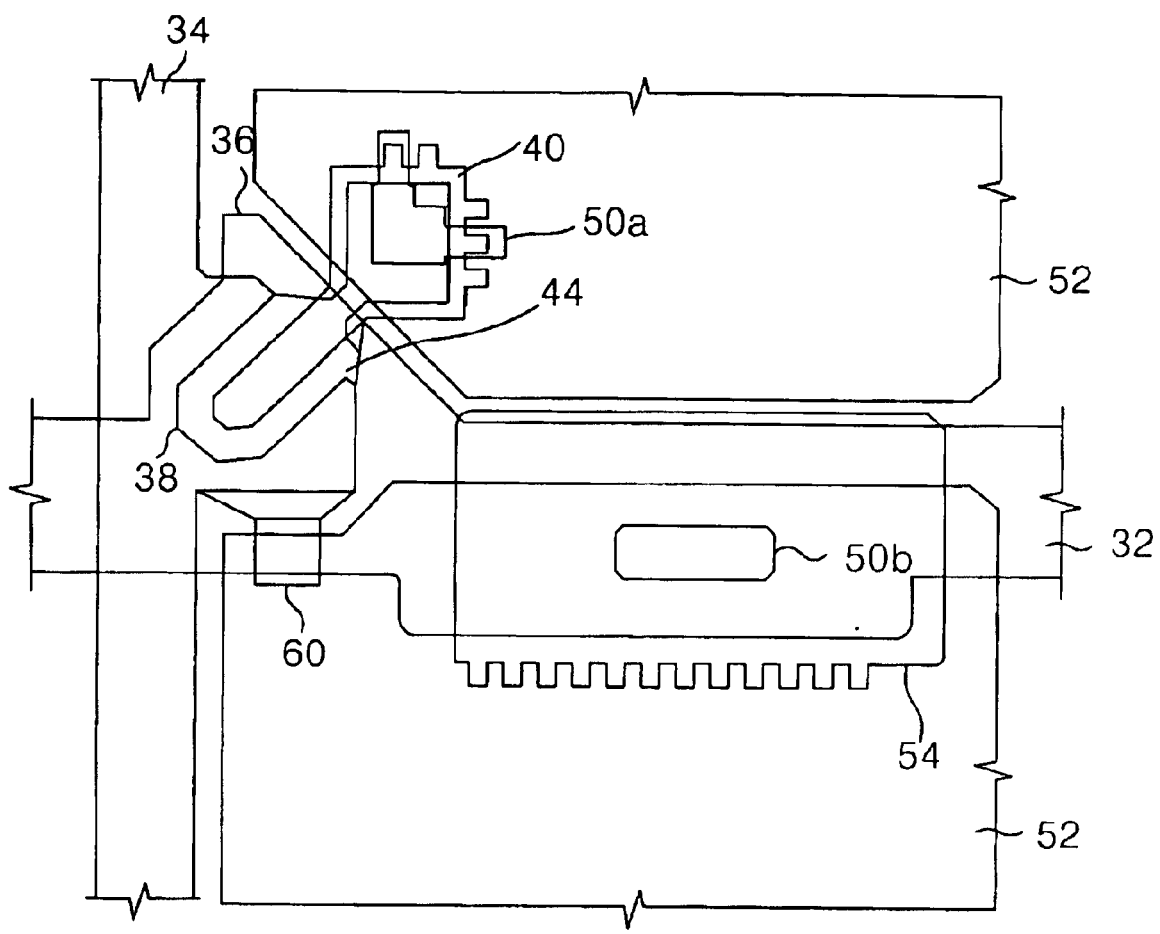
Figure 17E:
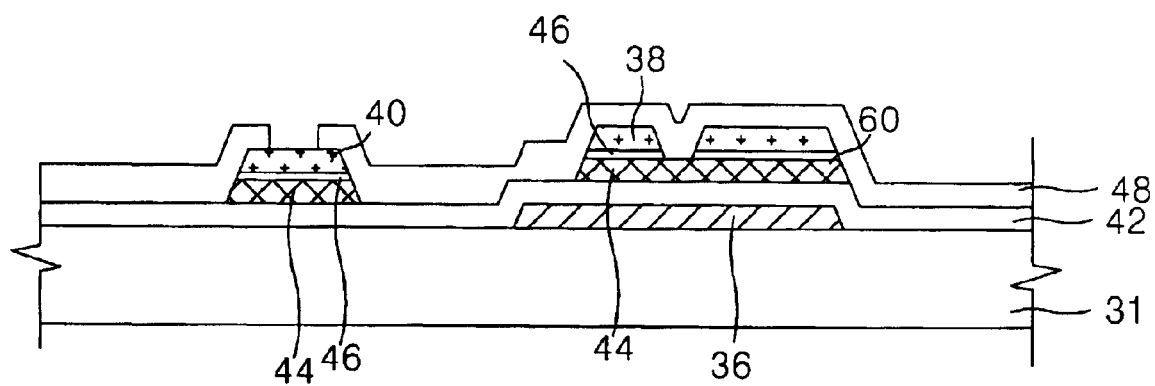
Figure 17F:
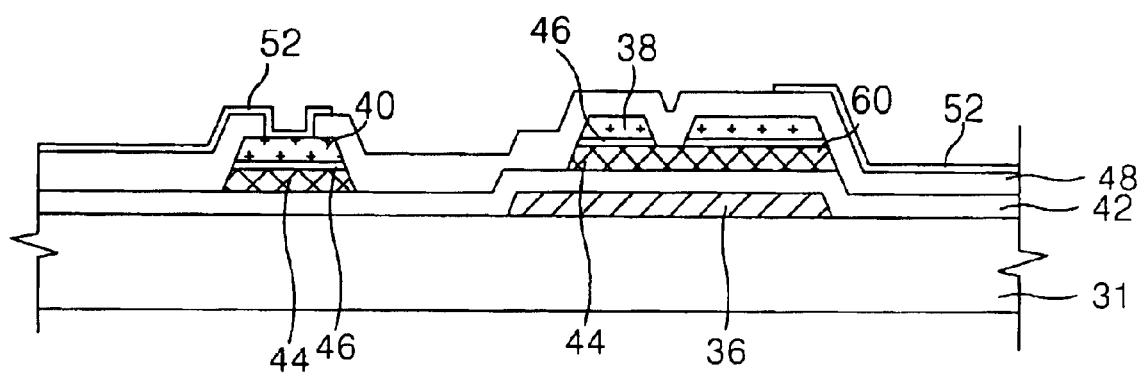

Referring to FIGS. 16C and 17E, a protective film 48, a first contact hole 50a and a second contact hole 50b are formed on the gate insulating film 42. The protective film 48, the first contact hole 50a and the second contact hole 50b are formed by depositing an insulating material on the gate insulating film 42. Then, the insulating material is patterned with a third mask to cover the storage electrode 54, the repair drain electrode 60, the common source electrode 38 and the pixel drain electrode 40.

The protective film 48 is formed of an inorganic insulating material, such as silicon nitride or silicon oxide. Alternatively, the protective film is formed of an organic insulating material, such as acrylic organic compound, Teflon, benzocyclobutene (BCB), cytop, or perfluorocyclobutane.

Referring to FIGS. 6D and 7F, the pixel electrode 52 is formed on the protective film 48. The pixel electrode 52 is formed by depositing any one of ITO, IZO and ITZO, which are transparent conductive materials, and patterning it with a fourth mask. The pixel electrode 52 is electrically in contact with the pixel drain electrode 40 through the first contact hole 50a. The pixel electrode 52 is electrically in contact with the storage electrode 54 through the second contact hole 50b.

Figure 18:
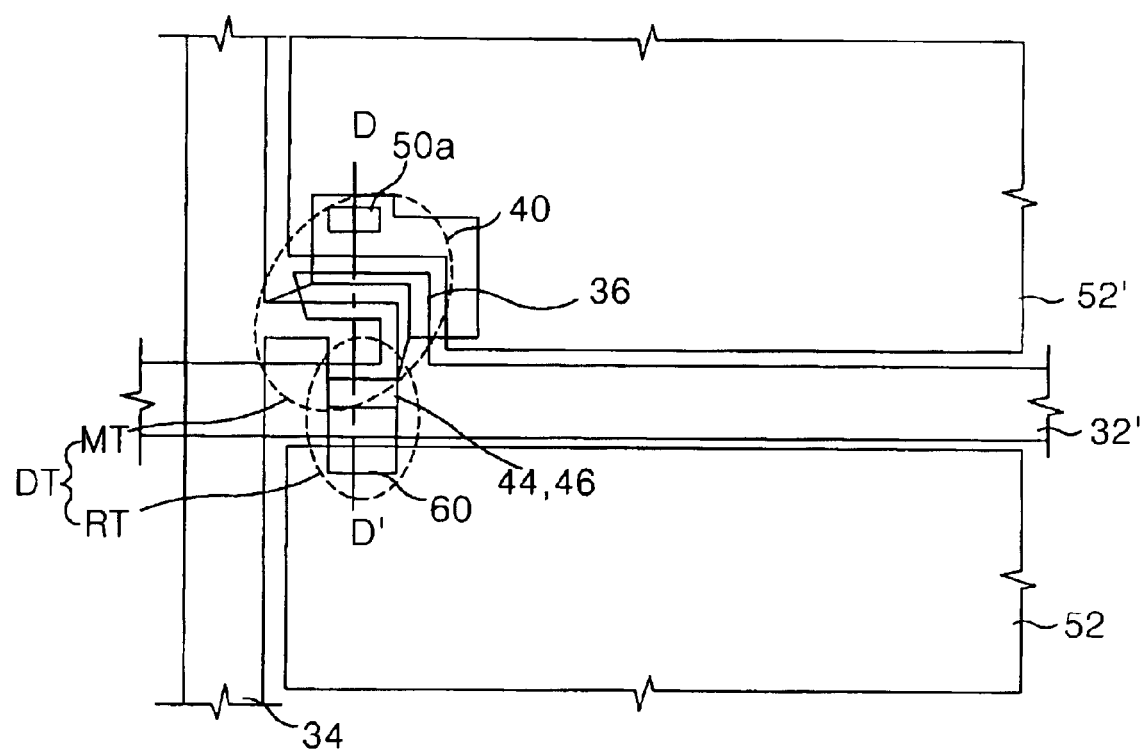
FIG. 18 is a plan view representing a liquid crystal display device according to a fourth embodiment of the present invention.
Figure 19:
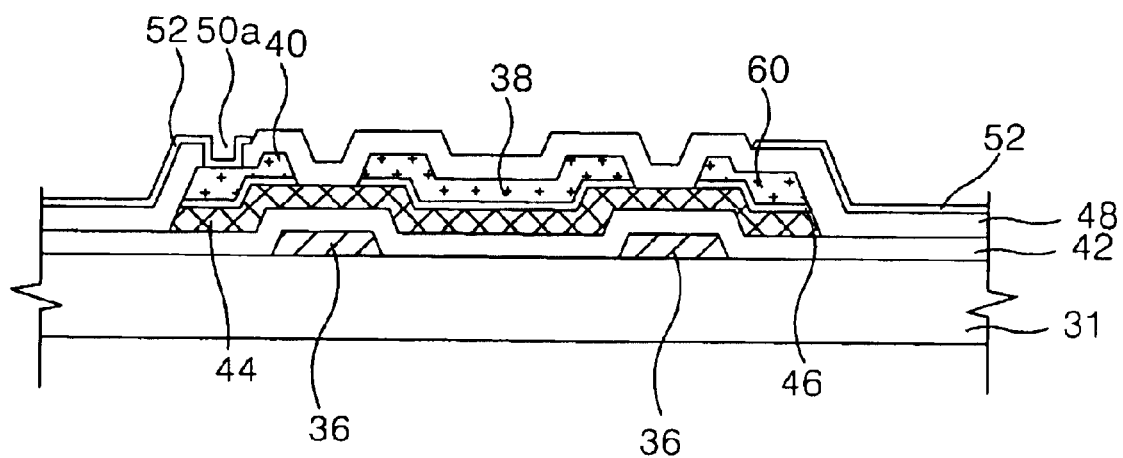
FIG. 19 is a sectional view representing the liquid crystal display device taken along the line D–D' in FIG. 18.

Referring to FIGS. 18 and 19, in a liquid crystal display device according to a fourth embodiment of the present invention, a lower substrate 31 includes the same structural elements as in the liquid crystal display device shown in FIG. 8, except that the semiconductor layers 44 and 46 are formed simultaneously as the data line 34, the common source electrode 38, the pixel drain electrode 40 and the repair drain electrode 60.

As described above, the dual channel TFT DT has one common source electrode 38 being connected with the data line 34. The pixel drain electrode 40 and the repair drain electrode 60 are formed at the neighboring part of the common source electrode 38. A main TFT MT and a repair TFT RT have channels and auxiliary channels between the pixel drain electrode 40 and the common source electrode 38, and between the repair drain electrode 60 and the common source electrode 38, in the dual channel TFT DT.

In the main TFT MT, a channel is formed at the corresponding part of the active layer 44 to the gate electrode 36 between the common source electrode 38 and the pixel drain electrode 40. The main TFT MT has the common source electrode 38 as a source terminal and the pixel drain electrode 40 as a drain terminal.

In the repair TFT RT, an auxiliary channel is formed at the corresponding part of the active layer 44 to the gate line 32 between the common source electrode 38 and the repair drain electrode 60. The repair TFT RT has the common source electrode 38 as a source terminal and the repair drain electrode 60 as a drain terminal. The repair drain electrode 60 is formed as overlapping with the pixel electrode 52.

The source terminal of the main TFT MT and the repair TFT RT are used as a common source electrode 38. The active layer 44 and the gate terminals 32 and 36 of the TFT MT and TFT RT are formed to be connected with each other through the lower part of the common source electrode 38. This arrangement reduces the size of the area occupied by the dual channel TFT DT. The gate electrode 36 projects only once from the gate line 32 and can play a role of the gate of the dual channel TFT DT.

Figure 20:
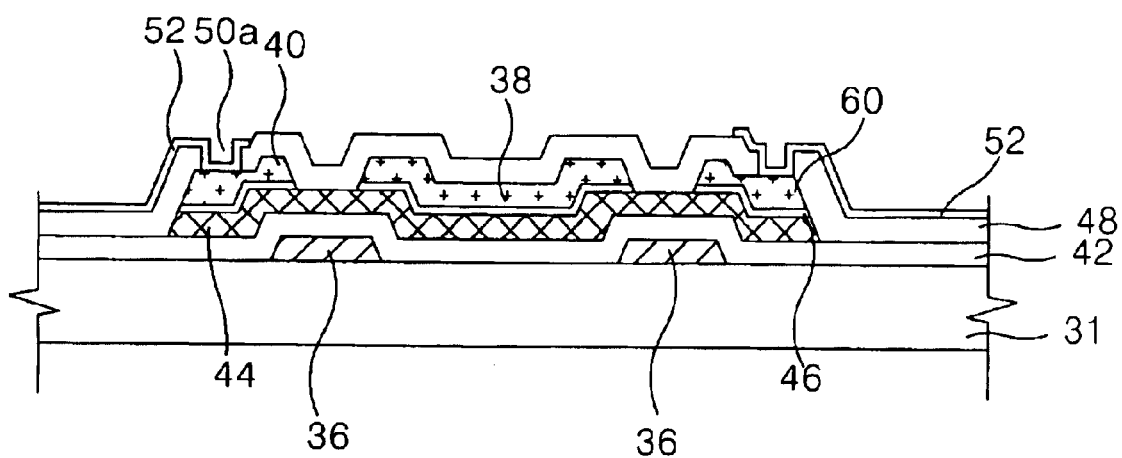
FIG. 20 is a sectional view representing the liquid crystal display device formed after implementing by laser the repair of the liquid crystal display device shown in FIG. 19.

If a broken wire fault occurs in the channel of the dual channel TFT DT, the neck part of the channel of the dual channel TFT DT is cut using the laser. As a result, the data signal from the data line 34 is no longer supplied to the pixel electrode 52. Next, the laser is used to melt the overlapping part of the pixel electrode 52 and the repair drain electrode 60 of the previous dual channel TFT DT, the protective film 48 between the pixel drain electrode 52 and the repair drain electrode 60 melts simultaneously to expose the repair drain electrode 60. The molten pixel electrode 52 flows into the lower part, such that the pixel electrode 52 and the repair drain electrode 60 of the previous dual channel TFT DT are electrically connected, as shown in FIG. 20. Due to this, the data signal inputted to the previous pixel electrode 52' is supplied to the pixel electrode 52 upon the high pulse application of the previous gate line 32' such that the bad pixel cell realizes the same color as the previous one. Generally, the data sizes of adjacent pixels are similar such that the bad pixel is not perceivable by inputting the data of the previous pixel. By the present invention, there needs to be formed only one common source electrode 38. The common source electrode is practically capable of playing a role with two TFT's. Therefore, the area occupied by the source electrode can be reduced to increase the proportion of a display area, that is, an aperture ratio.

Figure 21A:
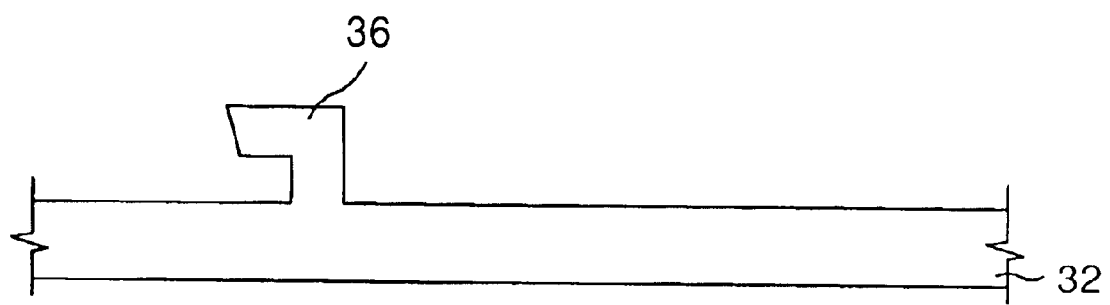
FIG. 21A to 21D are plan views representing a method of fabricating the liquid crystal display device shown in FIG. 18.
Figure 21B:
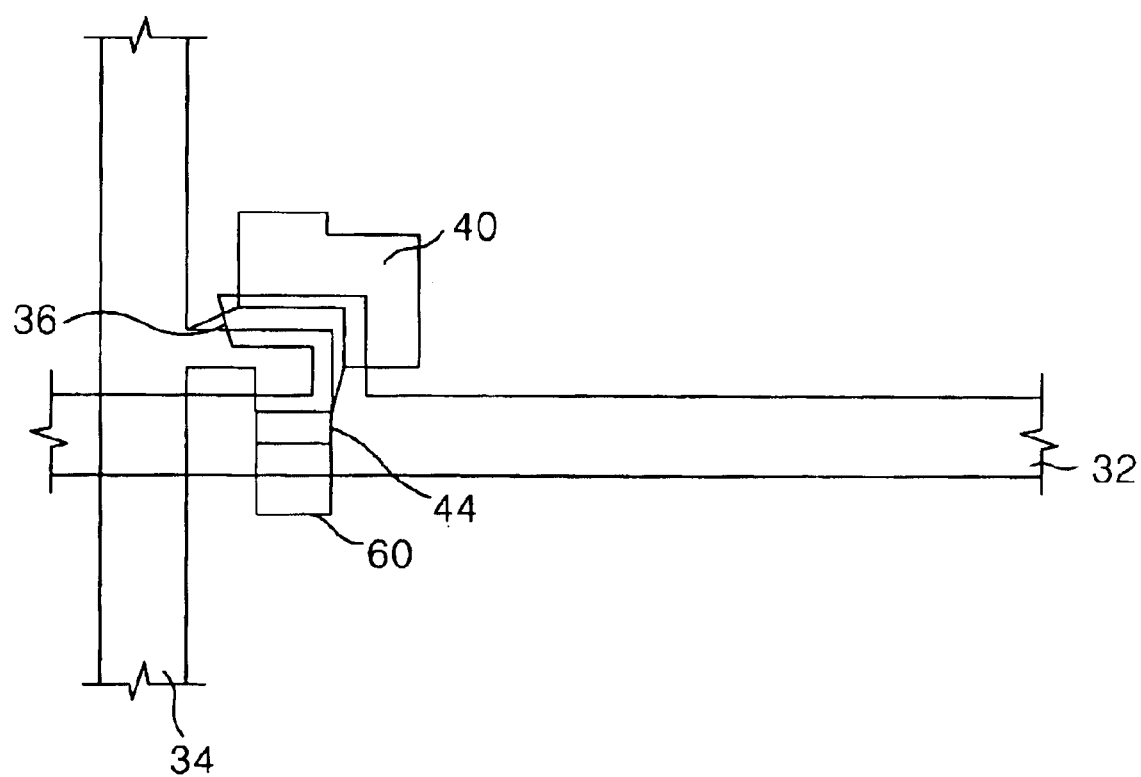
Figure 21C:
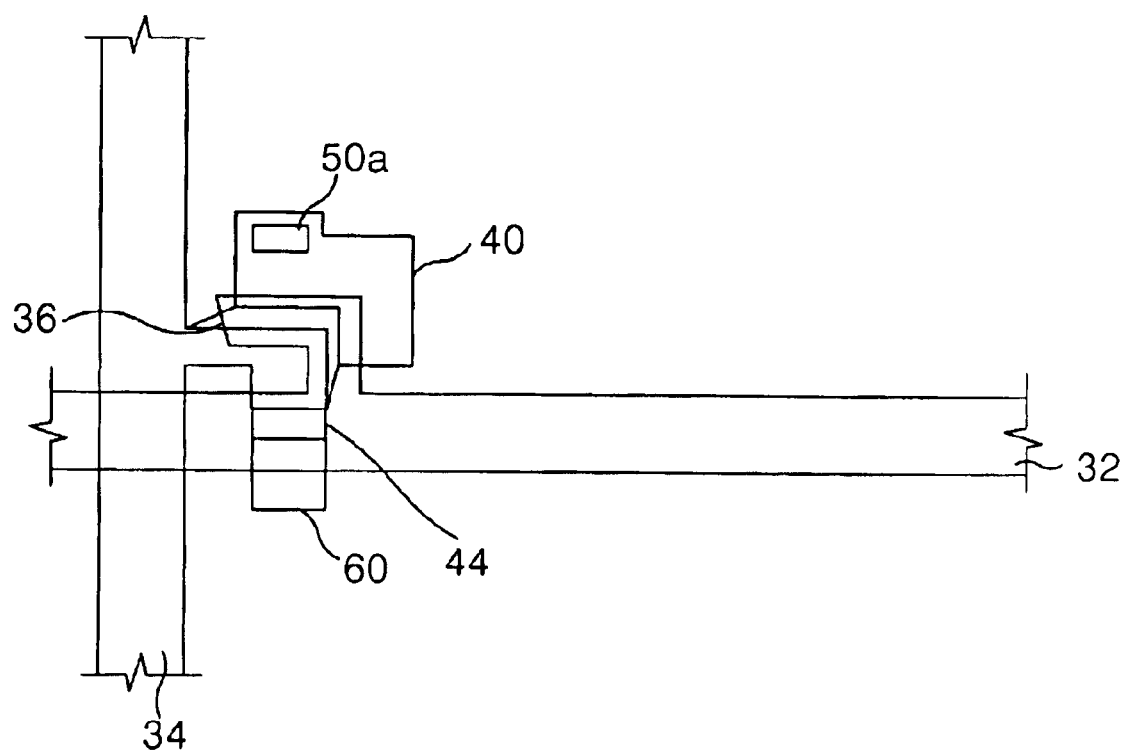
Figure 21D:
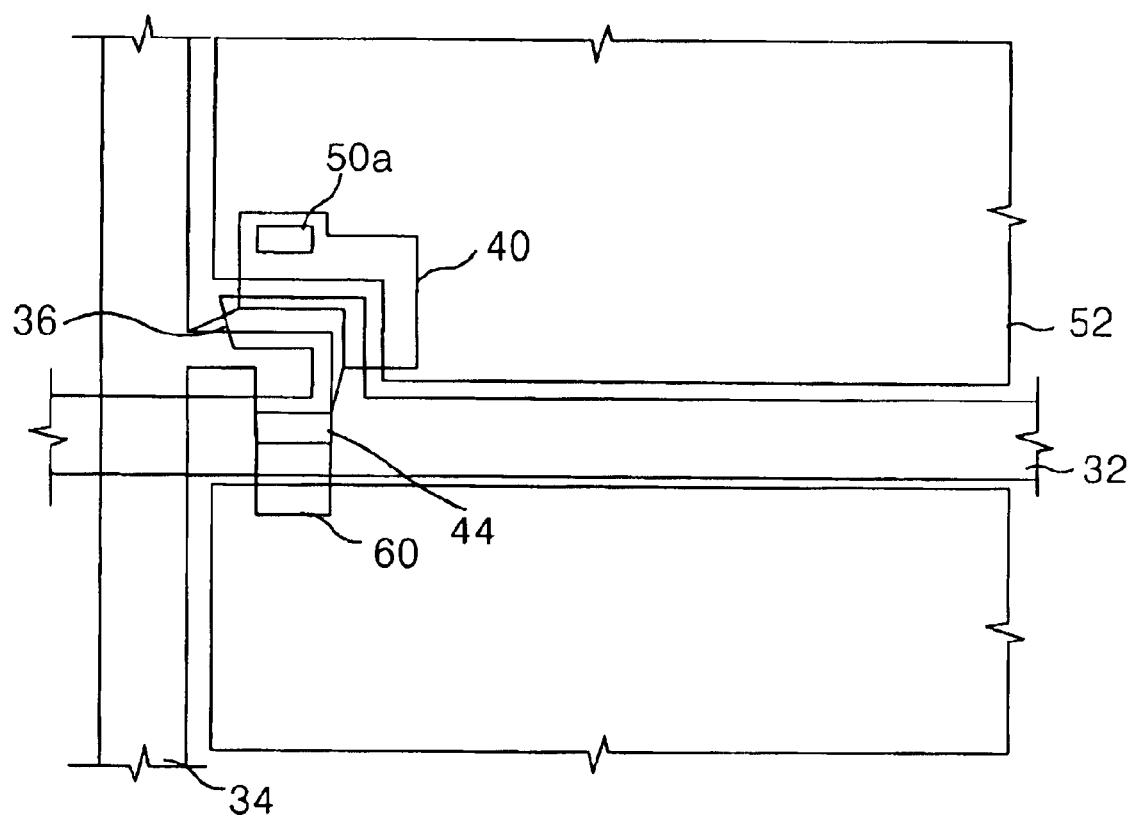
Figure 22A:
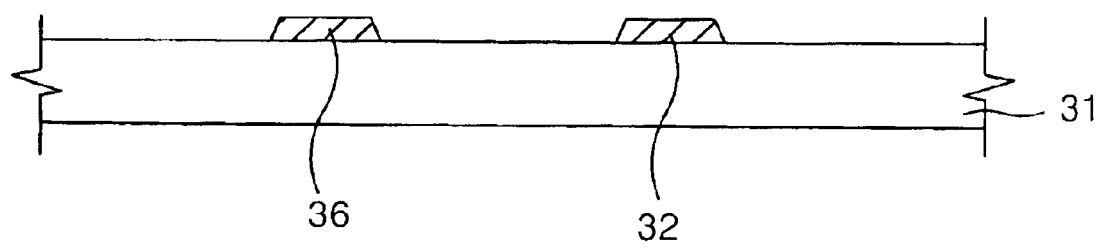
FIG. 22A to 22D are sectional views representing a method of fabricating the liquid crystal display device shown in FIG. 19.
Figure 22B:
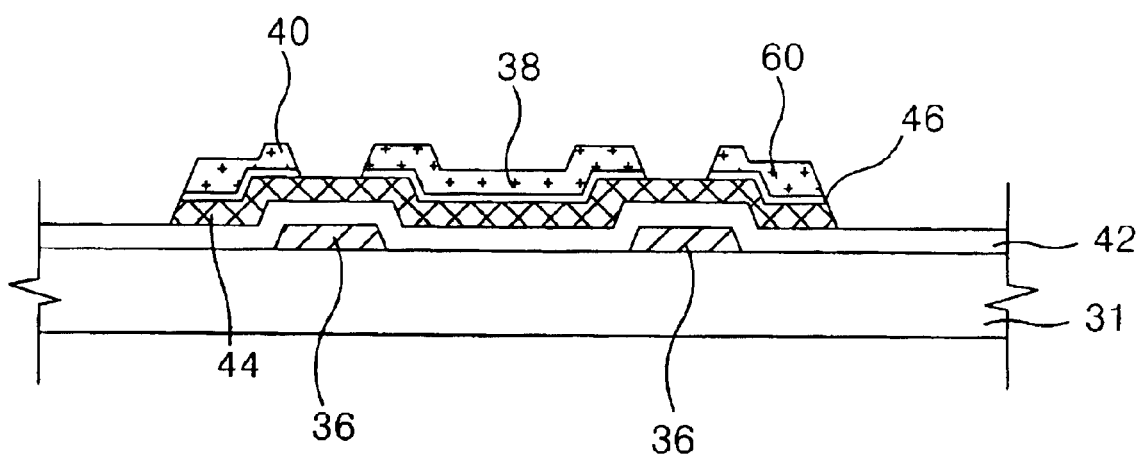
Figure 22C:
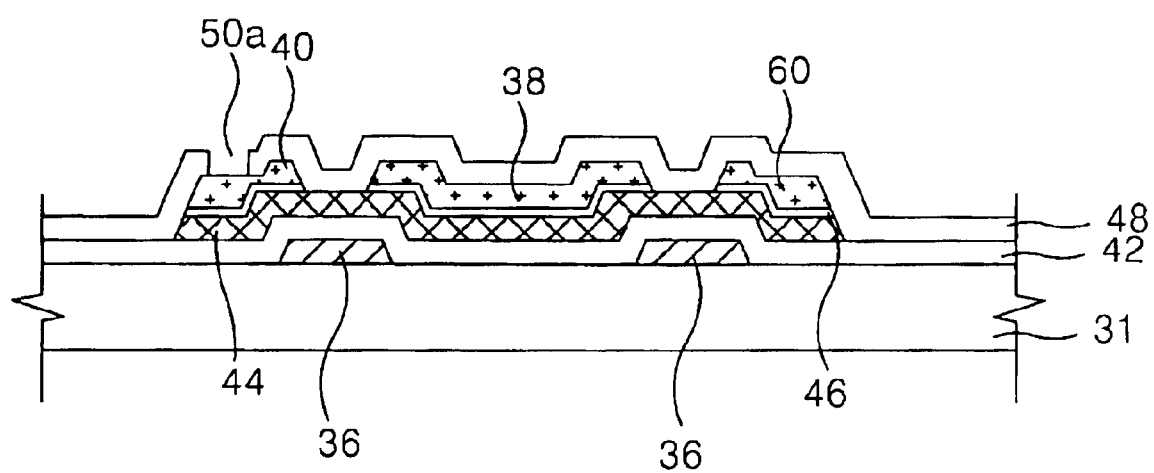
Figure 22D:
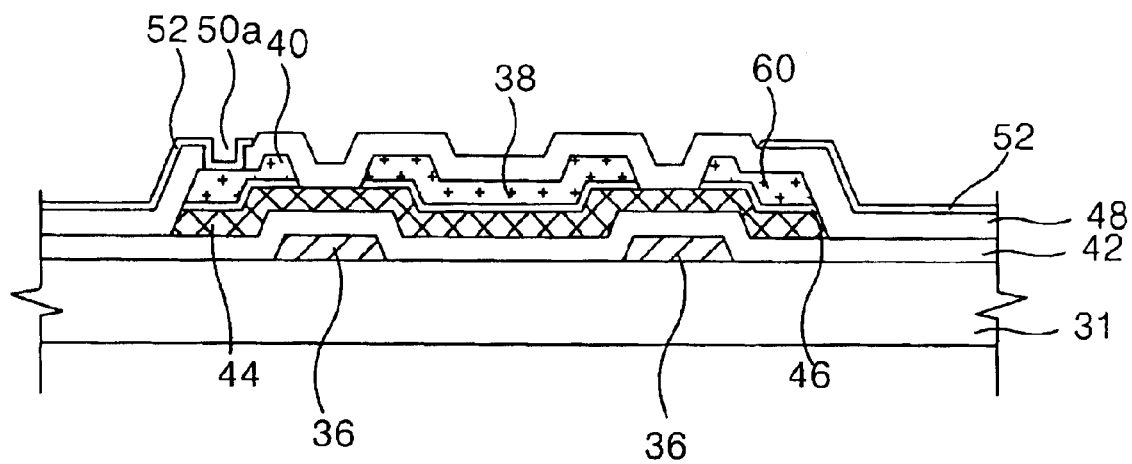

A method of fabricating a lower substrate 31 of the liquid crystal display device with such a constitution, includes the step of depositing a gate metal layer on the lower substrate 31. The gate metal layer is patterned to form the gate line 32 and the gate electrode 36, as shown in FIGS. 21A and 22A. Then, the gate insulating film 42 is entirely spread thereon. The active layer 44, the ohmic contact layer 46, the data line 32, the common source electrode 38, the drain electrode 40 and the repair drain electrode 60 are formed simultaneously, as shown in FIGS. 21B and 22B, by depositing the metal layer and the first and the second semiconductor layer materials on the gate insulating film 42, and then patterning them. Subsequently, the contact hole 50 is formed, as shown in FIGS. 21C and 22C, by entirely spreading and patterning the protective film 48. The pixel electrode 52 is formed, as shown in FIGS. 21D and 22D, by depositing a transparent conductive material on the protective film 48, and then patterning it.

The present invention concerns a liquid crystal display device and the fabricating method thereof. In the present invention, a pixel repairing method is employed if a fault occurs at a channel. A pixel electrode is connected with a repair drain electrode of a previous TFT, after using a laser to cut a data signal from a data line to a TFT.

According to the present invention, a same color is realized in the faulty or bad pixel cell as the previous pixel cell. This is contrary to the conventional dark point repair technique. By the present invention, one not only removes the fault due to the brightness point, but also increases the repair efficiency. Also, the source electrode of the repair TFT, used when repairing, and the source electrode of the main TFT are formed commonly, such that the display area is increased as much as the area of the conventional repair source electrode. By this arrangement, it is possible to realize a high aperture ratio. Because the active layer and the gate electrode of the main TFT and the repair TFT are connected with one another, via the lower part of the common source electrode, the pattern is not complicated and the size of the occupied area can be reduced.

The pixel repair method using the liquid crystal display device according to the present invention is capable of reducing the difference of brightness and color expression between a bad pixel and other normal pixels when compared to the conventional repair method of making the bad pixel a dark point.

It should be understood to the ordinary skilled person in the art that the invention is not limited to the disclosed embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:
   a main thin film transistor including
      a common source electrode receiving a data signal,
      a pixel drain electrode opposed to the common source electrode as having a predetermined main channel between them and connected to a first pixel electrode for driving the liquid crystal of a first horizontal line, and
      a gate electrode responding to a scan signal and switching on/off the main channel;
   an auxiliary thin film transistor including
      the common source electrode in the main thin film transistor,
      a gate line applying the scan signal to the gate electrode, and
      a repair drain electrode opposed to the common source electrode as having a predetermined auxiliary channel between them and formed to overlap with a second pixel electrode for driving the liquid crystal of a second horizontal line; and
   an active layer forming the main channel and the auxiliary channel, the active layer extended from the main channel to the auxiliary channel through the common source electrode area.

2. The liquid crystal display device according to claim 1, further comprising:
   a gate insulating film formed to cover the gate electrode and the gate line on a substrate;
   a semiconductor layer formed on the gate insulating film;
   a protective layer formed on the entire surface of the gate insulating film to cover the common source electrode, the pixel drain electrode and the repair drain electrode; and
   a contact hole formed in the protective film to have the pixel drain electrode electrically in contact with the pixel electrode.

3. The liquid crystal display device according to claim 2, wherein the semiconductor layer is formed at the neighbor area of the main thin film transistor, the auxiliary thin film transistor and a data line.

4. The liquid crystal display device according to claim 2, wherein the semiconductor layer is formed at the neighbor area of the main thin film transistor and the auxiliary thin film transistor.

5. The liquid crystal display device according to claim 1, further comprising:
   a gate insulating film formed to cover the gate electrode and the gate line on a substrate;
   a semiconductor layer formed on the gate insulating film;
   a protective layer formed on the entire surface of the gate insulating film to cover the common source electrode, the pixel drain electrode and the repair drain electrode; and
   a contact hole formed in the protective film to have the pixel drain electrode electrically in contact with the pixel electrode, and
   wherein the common source electrode, the pixel drain electrode and the repair drain electrode are patterned simultaneously as the semiconductor layer.

6. The liquid crystal display device according to claim 5, wherein the semiconductor layer is formed at the neighbor area of the main thin film transistor, the auxiliary thin film transistor and a data line.

7. The liquid crystal display device according to claim 5, wherein the semiconductor layer is formed at the neighbor area of the main thin film transistor and the auxiliary thin film transistor.

8. A method of fabricating a liquid crystal display device, comprising the steps of:
   forming a gate line and a gate electrode on a substrate;
   forming a gate insulating film on the substrate;
   forming a semiconductor layer on the gate insulating film;
   forming a data line and a common source electrode on the gate insulating film, and in addition, forming a pixel drain electrode and a repair drain electrode to oppose the common source electrode such that a main channel of a main thin film transistor and an auxiliary channel of an auxiliary thin film transistor reside in the semiconductor layer at the same time;
   forming a protective layer on the gate insulating film to cover the common source electrode, the pixel drain electrode and the repair drain electrode; and
   forming a pixel electrode on the protective film to overlap with the repair drain electrode and to be electrically in contact with the pixel drain electrode.

9. The method according to claim 8, wherein the gate electrodes of the main thin film transistor and the auxiliary thin film transistor are unified at the common source electrode area.

10. The method according to claim 8, wherein the semiconductor layer is formed at the neighbor area of the main thin film transistor, the auxiliary thin film transistor and the data line.

11. The method according to claim 8, wherein the semiconductor layer is formed at the neighbor area of the main thin film transistor and the auxiliary thin film transistor.

12. A method of fabricating a liquid crystal display device, comprising the steps of:
   forming a gate line and a gate electrode on a substrate;
   forming a gate insulating film on the substrate to cover the gate electrode and the gate line;
   forming a semiconductor layer, a common source electrode and a data line by depositing a semiconductor material and a metal layer on the gate insulating film and patterning them at the same time, and in addition, forming a pixel drain electrode and a repair drain electrode to oppose the common source electrode such that a main channel of a main thin film transistor and an auxiliary channel of an auxiliary thin film transistor reside in the semiconductor layer at the same time;
   forming a protective layer on the gate insulating film to cover the common source electrode, the pixel drain electrode and the repair drain electrode; and forming a pixel electrode on the protective film to overlap with the repair drain electrode and to be electrically in contact with the pixel drain electrode.

13. The method according to claim 12, wherein the gate electrodes of the main thin film transistor and the auxiliary thin film transistor are unified at the common source electrode area.

14. The method according to claim 12, wherein the semiconductor layer is formed at the neighbor area of the main thin film transistor, the auxiliary thin film transistor and the data line.

15. The method according to claim 12, wherein the semiconductor layer is formed at the neighbor area of the main thin film transistor and the auxiliary thin film transistor.

16. A repairing method of a liquid crystal display device, comprising the steps of:

connecting a pixel drain electrode for driving to a pixel electrode of a first horizontal line, and in addition, providing a thin film transistor including a repair drain electrode that overlaps with a pixel electrode of a second horizontal line;

sensing a bad pixel included in the horizontal lines;

opening a part of a drain electrode for driving of the bad pixel; and connecting the repair drain electrode to the pixel electrode of the bad pixel such that the same color data as a normal pixel, is supplied to the pixel electrode of the bad pixel.

* * * * *